(12) United States Patent
Bezbaruah et al.

(10) Patent No.: US 9,359,228 B2
(45) Date of Patent: Jun. 7, 2016

(54) IRON-FUNCTIONALIZED ALGINATE FOR PHOSPHATE AND OTHER CONTAMINANT REMOVAL AND RECOVERY FROM AQUEOUS SOLUTIONS

(71) Applicants: Achintya Bezbaruah, West Fargo, ND (US); Talal Bakheet Almeelbi, Yanbu (SA); Michael Quamme, Fargo, ND (US)

(72) Inventors: Achintya Bezbaruah, West Fargo, ND (US); Talal Bakheet Almeelbi, Yanbu (SA); Michael Quamme, Fargo, ND (US)

(73) Assignee: NDSU Research Foundation, Fargo, ND (US)

( * ) Notice: Subject to any disclaimer, the term of this patent is extended or adjusted under 35 U.S.C. 154(b) by 0 days.

(21) Appl. No.: 14/213,111

(22) Filed: Mar. 14, 2014

(65) Prior Publication Data

US 2014/0260468 A1 Sep. 18, 2014

Related U.S. Application Data

(60) Provisional application No. 61/791,202, filed on Mar. 15, 2013.

(51) Int. Cl.
| | |
|---|---|
| *C05D 9/02* | (2006.01) |
| *C02F 1/28* | (2006.01) |
| *C08B 37/00* | (2006.01) |
| *C05B 17/00* | (2006.01) |
| *C05B 7/00* | (2006.01) |
| *B01J 20/26* | (2006.01) |
| *B01J 20/32* | (2006.01) |

(Continued)

(52) U.S. Cl.
CPC ............ *C02F 1/288* (2013.01); *B01J 20/0229* (2013.01); *B01J 20/265* (2013.01); *B01J 20/267* (2013.01); *B01J 20/3236* (2013.01); *C05B 7/00* (2013.01); *C05B 17/00* (2013.01); *C05D 9/02* (2013.01); *C08B 37/0084* (2013.01); *C02F 1/281* (2013.01); *C02F 1/286* (2013.01); *C02F 2101/103* (2013.01); *C02F 2101/105* (2013.01); *C02F 2101/106* (2013.01); *C02F 2103/001* (2013.01); *C02F 2103/007* (2013.01); *C02F 2103/06* (2013.01); *C02F 2103/10* (2013.01); *C02F 2305/08* (2013.01)

(58) Field of Classification Search
None
See application file for complete search history.

(56) References Cited

U.S. PATENT DOCUMENTS

| | | | |
|---|---|---|---|
| 4,589,906 | A | 5/1986 | Brunn et al. |
| 6,143,692 | A | 11/2000 | Sanjay et al. |

(Continued)

FOREIGN PATENT DOCUMENTS

| | | |
|---|---|---|
| CN | 102531128 A | 4/2012 |
| JP | 9-103608 A | 4/1997 |

(Continued)

OTHER PUBLICATIONS

Joon H. Min et al, "Removal of Selenite and Chromate using Iron(III)-Doped Alginate Gels", Water Environment Research; Mar./Apr. 1999; 71, 2, 169-175.*

(Continued)

*Primary Examiner* — Wayne Langel
(74) *Attorney, Agent, or Firm* — Mueting, Raasch & Gebhardt, P.A.

(57) ABSTRACT

A biodegradable iron-crosslinked alginate is useful as a remediation agent for environmental contaminants such as phosphate. When charged with phosphate, or other nutrients, the iron-functionalized alginate can be used as an agricultural fertilizer.

19 Claims, 11 Drawing Sheets

(51) Int. Cl.
| | |
|---|---|
| *B01J 20/02* | (2006.01) |
| *C02F 101/10* | (2006.01) |
| *C02F 103/00* | (2006.01) |
| *C02F 103/10* | (2006.01) |
| *C02F 103/06* | (2006.01) |

(56) References Cited

U.S. PATENT DOCUMENTS

| | | | | |
|---|---|---|---|---|
| 6,203,709 | B1* | 3/2001 | Min et al. | 210/683 |
| 6,689,485 | B2 | 2/2004 | Ponder et al. | |
| 6,989,102 | B1* | 1/2006 | Park | B01J 20/20 201/679 |
| 2003/0041639 | A1* | 3/2003 | Meyer et al. | 71/27 |
| 2003/0134409 | A1 | 7/2003 | Mallouk et al. | |
| 2005/0051492 | A1* | 3/2005 | Tranter et al. | 210/688 |
| 2006/0237371 | A1 | 10/2006 | Sylvester et al. | |
| 2007/0205157 | A1* | 9/2007 | Jones et al. | 210/688 |
| 2007/0256985 | A1 | 11/2007 | Zhao et al. | |
| 2009/0028810 | A1 | 1/2009 | Zhang et al. | |
| 2010/0307980 | A1* | 12/2010 | Troy J. et al. | 210/688 |
| 2011/0042325 | A1 | 2/2011 | Bezbaruah et al. | |
| 2012/0273431 | A1 | 11/2012 | Huang et al. | |
| 2012/0288479 | A1 | 11/2012 | Melman | |
| 2013/0320255 | A1 | 12/2013 | Chisholm et al. | |
| 2014/0141243 | A1* | 5/2014 | Siwek et al. | 428/389 |
| 2015/0166701 | A1 | 6/2015 | Chisholm et al. | |

FOREIGN PATENT DOCUMENTS

| | | |
|---|---|---|
| WO | WO 2009/111722 A2 | 9/2009 |
| WO | WO 2009/111722 A3 | 9/2009 |
| WO | WO 2009/111722 A2 | 11/2009 |
| WO | WO 2009/111722 A3 | 12/2009 |
| WO | WO 2012/040525 A1 | 3/2012 |
| WO | WO 2013/173734 A1 | 11/2013 |
| WO | WO 2014/144214 A2 | 9/2014 |
| WO | WO 2014/168728 A1 | 10/2014 |
| WO | WO 2014/144214 A3 | 11/2014 |

OTHER PUBLICATIONS

Thomas L. Eberhardt et al, "Biosorbents prepared from wood particles treated with anionic polymer and iron salt: Effect of particle size on phosphate adsorption", Bioresource Technology 99 (2008), 626-630.*

Thomas L. Eberhardt et al, "Phosphoate removal by refined aspen wood fiber treated with carboxymethyl cellulose and ferrous chloride", Bioresource Technology 97 (2006), 2371-2376.*

Almeelbi et al. "Zero-valent Iron Nanoparticles for Aqueous Nitrate and Phosphate Removal," Oral presentation; Nov. 9, 2010, at the *Eastern South Dakota Water Conference* Brookings, SD: Nov. 9-10, 2010.

Almeelbi, Talal, "Aqueous Phosphate Removal Using Bare and Ca-Alginate Entrapped Nanoscale Zero-Valent Iron," *2011 World Environmental & Water Resources Congress* (American Society of Civil Engineers and Environmental & Water Resources Institute). Palm Springs, CA: May 22-26, 2011. Proceedings paper published by the American Society of Civil Engineers; Copyright 2011: pp. 1733-1740.

Almeelbi et al. "Aqueous phosphate removal using nanoscale zero-valent iron," Jun. 28, 2012 *J. Nanoparticle Res.* 14:900; 14 pages. Available online on Jun. 28, 2012.

Almeelbi, Talal, "Adsorptive Removal and Recovery of Phosphate from Aqueous Solution by Nanoscale Zerovalent Iron Particles," Abstract No. 867; Emerging and Innovative Technologies in Nano-Scale Water Treatment Session of the *2012 World Environmental & Water Resources Congress* (American Society of Civil Engineers and Environmental & Water Resources Institute). Albuquerque, NM: May 20-24, 2012.

Almeelbi et al., "Bioavailability of Nanoparticle-sorbed Phosphate: *Spinacia oleracea* and *Selenastrum capricornutum* Studies," Abstract No. 998 presented May 22, 2013; Sustainable Environmental Nanotechnology Session of the *2013 World Environmental & Water Resources Congress* (American Society of Civil Engineers and Environmental & Water Resources Institute). Cincinnati, OH: May 19-23, 2013.

Bezbaruah et al. "Entrapment of iron nanoparticles in calcium alginate beads for groundwater remediation applications," 2009 *J. Hazard. Mater.* 166(203):1339-1343. Available online on Dec. 14, 2008.

Bezbaruah, "ECS Green Bag Lunch Presentation," slides presented at North Dakota State University on Oct. 5, 2010. 6 pages.

Bezbaruah et al. "Encapsulation of iron nanoparticles in alginate biopolymer for trichloroethylene remediation," 2011 *J. Nanoparticle Res.* 13:6673-6681.

Bezbaruah et al., "Sustainability and Nanotechnology Education in K-12: Hands-on Teaching Modules for Middle School Students and Summer Research Experience for High School Students," Abstract No. 1088 presented May 20, 2013; Triple Bottom Line Technical Session Detail of the *2013 World Environmental & Water Resources Congress* (American Society of Civil Engineers and Environmental & Water Resources Institute). Cincinnati, OH: May 19-23, 2013.

Bezbaruah et al., "Ca-alginate entrapped nanoscale iron: arsenic treatability and mechanism studies," 2014 *J. Nanopart. Res.* 16:2175. 10 pages. Available online on Dec. 7, 2013.

Bezbaruah, "Arsenic Contaminated Groundwater Remediation by Entrapped Nanoscale Zero-Valent Iron," Grant Abstract, Project ID: 2011ND238B [online]. U.S. Geological Survey. Project dates Mar. 1, 2011 to Feb. 29, 2012[retrieved on Mar. 13, 2013]. Retrieved from the Internet: <water.usgs.gov/wrri/2011grants/2011ND238B.html>; 2 pages.

Bezbaruah, "Enhancing Nanoparticle Dispersion though Surface Modification using Biopolymers," Grant Abstract, Award #1125674 [online]. National Science Foundation; Divisional of Civil, Mechanical and Manufacturing Innovation (CMMI). Project dates Mar. 1, 2011 to Aug. 31, 2014 [retrieved on De. 26, 2014]. Retrieved from the Internet: <nsf.gov/awardsearch/showAward?AWD_ID=1125674&HistoricalAwards=false>; 2 pages.

Capecchi et al. "Arsenic Contaminated Groundwater Remediation by Entrapped Nanoscale Zero-Valent Iron," *2011 World Environmental and Water Resources Congress* (American Society of Civil Engineers and Environmental & Water Resources Institute). Palm Springs, CA. May 22-26, 2011. Proceedings paper published by the American Society of Civil Engineers; Copyright 2011: pp. 3389-3395.

Cisse et al., "Use of Biopolymer Entrapped Metal and Bacteria for Effective Removal of Sulfate from Surface Waters," Abstract No. 994 presented May 22, 2013; Emerging and Innovative Technologies in Water and Wastewater Treatment I Session of the *2013 World Environmental & Water Resources Congress* (American Society of Civil Engineers and Environmental & Water Resources Institute). Cincinnati, OH: May 19-23, 2013.

Cleary et al. "Analysis of phosphate in wastewater using an autonomous microfluidics-based analyser," 2009 *World Acad. Sci. Eng. Technol.* 52:196-199.

Cordray, "Phosphorus removal characteristics on biogenic ferrous iron oxides," Thesis (M.S. in environmental engineering); cover date Dec. 2008. Washington State University—Department of Civil and Environmental Engineering. Retrieved from the Internet: <dissertations.wsu.edu/Thesis/Fall2008/a_cordray_111708.pdf>; 80 pages.

de-Bashan et al. "Recent advances in removing phosphorus from wastewater and its future use as fertilizer (1997-2003)," Nov. 2004 *Water Res.* 38(19):4222-4246.

Du et al. "$TiO_2$ and ZnO nanoparticles negatively affect wheat growth and soil enzyme activities in agricultural soil," 2011 *J. Environ. Monit.* 13(4):822-828.

Giasuddin et al. "Adsorption of humic acid onto nanoscale zerovalent iron and its effect on arsenic removal," 2007 *Environ. Sci. Technol.* 41:2022-2027. Available online on Feb. 17, 2007.

"Groundwater Remediation with Recycling Capabilities," NDSU Research Foundation. Green Technologies. Publication Date Unknown [retrieved on Sep. 13, 2013]. 2 pages.

Hossain et al. "Cross-linked Biopolymer Beads for Aqueous Phosphate Removal: Possible Application in Eutrophic Lakes," Slides

(56) References Cited

OTHER PUBLICATIONS presented with Oral Presentation. *Eastern South Dakota Water Conference, South Dakota Water Resources Institute*, Brookings, South Dakota, Oct. 2013.

Kalita et al., "Novel Biodegradable Soybean Oil and Ethylene Glycol-Based Amphiphilic Copolymers for the Treatment of Zerovalent Iron Nanoparticles," Abstract ENVR 151 and slides accompanying oral presentation on Apr. 8, 2013, at the *245th ACS National Meeting—Division of Transformative Nanotechnologies: Energy and Environment, Solutions and Challenges* (American Chemical Society). New Orleans, LA: Apr. 7-11, 2013. Abstract available online [retrieved Dec. 29, 2014]. Retrieved from the Internet: <abstracts.acs.org/chem/245nm/program/view.php?obj_id=181213&terms=>; 28 pages.

Kalita et al., "A Greener Approach to Enhance Colloidal Stability of NZVI for Groundwater Remediation," Abstract No. 976 presented May 22, 2013; Sustainable Environmental Nanotechnology Session of the *2013 World Environmental & Water Resources Congress* (American Society of Civil Engineers and Environmental & Water Resources Institute). Cincinnati, OH: May 19-23, 2013.

Keller et al. "Toxicity of nano-zero valent iron to freshwater and marine organisms," 2012 *PLoS One* 7(8):e43983; 10 pages. Available online on Aug. 30, 2012.

Krajangpan et al. "Effective Delivery of Iron Nanoparticles by Amphiphilic Polysiloxane graft Copolymeric Vehicles for Groundwater Remediation," Jun. 2013 *Technical Report No. ND13-03*. North Dakota Water Resources Research Institute. North Dakota State University; Fargo, North Dakota. 37 pages.

Kroll et al. "In Situ Preparation of Nanocrystalline $\gamma$-$Fe_2O_3$ in Iron(II) Cross-Linked Alginate Gels," Aug. 14, 1996 *Chem. Mater.* 8(8):1594-1596.

Li et al., "ZeroValent Iron Nanoparticles for Abatement of Environmental Pollutants: Materials and Engineering Aspects," Dec. 21, 2006 *Crit. Rev. Solid State Mater. Sci.* 31:111-122.

McCobb et al. "Phosphorus in a Ground-Water Contaminant Plume Discharging to Ashumet Pond, 1999," *Water-Resources Investigations Report 02-4306*. U.S. Geological Survey: Denver, CO; 2003. Retrieved from the Internet: <pubs.usgs.gov/wri/wri024306/pdfs/wrir024306.pdf>; 76 pages.

Michaud, "A Citizen's Guide to Understanding and Monitoring Lakes and Streams," 1991. Publication #94-149; Washington State Department of Ecology. 73 pages.

Mishra et al. "Review on adverse effects of water contaminants like arsenic, fluoride and phosphate and their remediation," Apr. 2010. *J. Sci. Industr. Res.* 69(4):249-253.

Moore et al. "Methods for Removing Selenium from Aqueous Systems," *2011 Proceedings Tailings and Mine Waste*. Vancouver, BC, Nov. 6-9, 2011. 11 pages.

Morris et al. "Chiroptical and stoichiometric evidence of a specific, primary dimerisation process in alginate gelation," 1978 *Carbohyd. Res.* 66:145-154.

NDDH (North Dakota Department of Health), "North Dakota 2006 Integrated Section 305(b) Water Quality Assessment Report and Section 303(d) List of Waters needing Total Maximum Daily Loads," North Dakota Department of Health, Division of Water Quality. Bismarck, ND. Retrieved from the Internet: <library.nd.gov/statedocs/Health/2006IntegratedReportforNorthDakotaFinalDraft-20060413%28f%2920070405.pdf>; 207 pages.

NDSU: It'S Happening At State, Mar. 15, 2013, vol. 15, Issue 5. Published by the Office of the Vice President for University Relations. Available online [retrieved on Sep. 17, 2013]. Retrieved from the Internet: <ndsu.edu/fileadmin/ihas/IHAS_Schedule/2013_Archive/ihas03152013.pdf>; 20 pages.

"North Dakota Water Resources Research Institute Annual Technical Report," FY 2011. North Dakota Water Resources Research Institute (NDWRRI). Retrieved from the Internet: <water.usgs.gov/wrri/AnnualReports/2011/FY2011_ND_Annual_Report.pdf>; 42 pages.

*North Dakota Water Resources Research Institute Newsletter*, Jul. 2013. Available online [retrieved on Sep. 17, 2013]. Retrieved from the Internet: <ndsu.edu/wrri/newsletters/2013newsletter.pdf>; 18 pages.

Pan et al. "Development of polymer-based nanosized hydrated ferric oxides (HFOs) for enhanced phosphate removal from waste effluents," Sep. 2009. *Water Res.* 43(17):4421-4429. Available online on Jul. 4, 2009.

Pate et al., "Plant-based Polymers to Coat Iron Nanoparticles: Colloidal Stability and Contaminant Remediation Studies," Abstract No. 981 presented May 22, 2013; Emerging and Innovative Technologies in Water and Wastewater Treatment I Session of the *2013 World Environmental & Water Resources Congress* (American Society of Civil Engineers and Environmental & Water Resources Institute). Cincinnati, OH: May 19-23, 2013.

Quamme, Michael, "Selenium Removal from Surface and Groundwater: Exploratory Research with Iron Nanoparticles," Abstract No. 57 presented May 23, 2012, Groundwater Remediation Technologies-1 Session of the *2012 World Environmental & Water Resources Congress* (American Society of Civil Engineers and Environmental & Water Resources Institute). Albuquerque, NM: May 20-24, 2012.

Quamme et al., "Entrapment of Iron Nanoparticles in Alginate Beads for Aqueous Selenium Removal," Abstract No. 983 presented May 22, 2013; Waste Remediation and Treatment Session of the *2013 World Environmental & Water Resources Congress* (American Society of Civil Engineers and Environmental & Water Resources Institute). Cincinnati, OH: May 19-23, 2013.

Ritt et al. "Optimization of aqueous phosphate removal using modified biopolymer beads," Abstract for Oral Presentation. *2014 NDSU EXPLORE Undergraduate Excellence in Research and Scholarly Activity.* Nov. 4, 2014.

Shabnam et al. "Contaminant diffusion and degradation studies with alginate encapsulated iron nanoparticles," Poster Abstract ENVR177 presented at the *237th ACS National Meeting |Spring 2009—Division of Environmental Chemistry* (American Chemical Society). Salt Lake City, UT: Mar. 22-26 Submitted ACS Salt Lake City, UT 2009. Abstract available online [retrieved Dec. 29, 2014]. Retrieved from the Internet: <oasys2.confex.com/acs/237nm/techprogram/P1247910.HTM>; 1 page.

Shabnam et al., "Microbial Degradation of Polydimethylsiloxane: Ramifications in Groundwater Remediation and Biomedical Applications," Abstract No. 989 presented May 20, 2013; Groundwater Remediation Technologies 2 Session of the *2013 World Environmental & Water Resources Congress* (American Society of Civil Engineers and Environmental & Water Resources Institute). Cincinnati, OH: May 19-23, 2013.

Shanbhogue et al. "Alginate Encapsulated Nanoparticle-Microorganism System for Trichloroethylene Remediation," *Technical Report No. ND12-08.* North Dakota Water Resources Research Institute. North Dakota State University; Fargo, North Dakota. 29 pages.

Tratnyek et al. "Nanotechnologies for environmental cleanup," May 2006. *Nanotoday* 1(2):44-48.

U.S. Environmental Protection Agency, "Ecological restoration: a tool to manage stream quality," *EPA Report No. 841-F-95-007.* U.S. Environmental Protection Agency: Washington, D.C.; Nov. 1995. Retrieved from the Internet: <nepis.epa.gov/Exe/ZyPDF.cgi/20004PSY.PDF?Dockey=20004PSY.PDF>; 186 pages.

U.S. Geological Survey, "Phosphate Rock" *Mineral Commodity Summaries* Jan. 2013. Retrieved from the Internet: <minerals.usgs.gov/minerals/pubs/commodity/phosphate_rock/mcs-2013-phosp.pdf>; 2 pages.

Zhang et al. "Nanoscale iron particles for environmental remediation: an overview," Aug. 2003 *J. Nanopart. Res.* 5:323-332.

International Search Report and Written Opinion mailed Oct. 19, 2009, in related application PCT/US2009/036370. 7 pages.

International Search Report and Written Opinion mailed Oct. 2, 2014, in related application PCT/US2014/028524. 11 pages.

International Search Report and Written Opinion mailed Jul. 24, 2014, in related application PCT/US2014/028469. 11 pages.

Ahn et al. "Waste lime as a potential cation source in the phosphate crystallization process," 2006 *Environ. Technol.* 27:1225-1231.

Almeelbi et al., "Aqueous Nitrate and Phosphate Removal with Nanoscale Iron Slurry, Experimental Program to Stimulate Competi-

(56) References Cited

OTHER PUBLICATIONS tive Research," Poster abstract presented at the *ND EPSCoR 2010 State Conference*. Grand Forks, ND: Sep. 29, 2010.

Almeelbi et al. "Sustainable Nanotechnology for Phosphate "Mining": A Peek into Global Nutrient Security," Oct. 24, 2012 Abstract. 1 page. 3rd North Dakota Water Resource Research Institute Distinguished Water Seminar, Oct. 22-23, 2012 at NDSU.

Archana et al., "Nanoparticle Delivery Vehicles for Groundwater Remediation: Sustainability Evaluation Through Biodegradation Studies," Sustainable Environmental Nanotechnology Session of the *2012 World Environmental & Water Resources Congress* (American Society of Civil Engineers and Environmental & Water Resources Institute). Albuquerque, NM: May 20-24, 2012. Proceedings paper published by the American Society of Civil Engineers; Copyright 2012: pp. 2823-2828.

Ashley et al. "A brief history of phosphorus: From the philosopher's stone to nutrient recovery and reuse," Aug. 2011 *Chemosphere.* 84(6):737-746. Available online on Apr. 8, 2011.

Babatunde et al. "Equilibrium and kinetic analysis of phosphorus adsorption from aqueous solution using waste alum sludge," Dec. 15, 2010 *J. Hazard. Mater.* 184:746-752. Available online on Sep. 17, 2010.

Blackall et al. "A review and update of the microbiology of enhanced biological phosphorus removal in wastewater treatment plants," Aug. 2002 *Antonie Van Leeuwenhoek* 81(1-4):681-691.

Capecchi et al., "Arsenic Contaminated Groundwater Remediation by Entrapped Nanoscale Zero-valent Iron (NZVI)," Poster abstract presented at the *ND EPSCoR 2010 State Conference*. Grand Forks, ND: Sep. 29, 2010.

Caravelli et al. "Phosphorous removal in batch systems using ferric chloride in the presence of activated sludges," May 15, 2010 *J. Hazard. Mater.* 177:199-208. Available online on Dec. 11, 2009.

Cheung et al. "Improving phosphate removal or sand infiltration system using alkaline fly ash," Jul. 2000 *Chemosphere* 41:243-249.

Chitrakar et al. "Phosphate adsorption on synthetic goethite and akaganeite," Jun. 15, 2006 *J. Colloid. Interface Sci.* 298(2):602-608. Available online on Feb. 7, 2006.

Choi et al. "Comparison of Surface-Modified Adsorbents for Phosphate Removal in Water," Jul. 2012 *Water Air and Soil Pollution* 223(6):2881-2890. Available online on Jan. 11, 2012.

Cisse, "Use of Biopolymer Entrapped Sulfate Reducing Bacteria and Metal Nanoparticles for Effective Aqueous Sulfate Removal," Master's Thesis; cover date—Jul. 2013. North Dakota State University. 141 pages. Available on Dec. 12, 2013.

Cordell et al. "The story of phosphorus: global food security and food for thought," May 2009 *Glob. Enrivon. Change—Human Policy Dimens.* 19:292-305.

Cordell et al. "Towards global phosphorus security: a systems framework for phosphorus recovery and reuse options," Aug. 2011 *Chemosphere* 84:747-758.

Cornel et al. "Phosphorus recovery from wastewater: needs, technologies and costs," 2009 *Water Sci. Technol.* 59:1069-1076.

Das et al. "Adsorption of some bivalent heavy metal ions from aqueous solutions by manganese nodule leached residues," Jan. 15, 2006 *J. Colloid Interface Sci.* 293(2):253-262. Available online on Aug. 10, 2005.

de-Bashan et al. "Fertilizer potential of phosphorus recovered from wastewater treatments," in *First International Meeting on Microbial Phosphate Solubilization. vol. 102 of Developments in Plant and Soil Sciences.* Velázquez et al. (Eds.) Springer International Publishing AG: Cham (ZG) Switzerland; 2007. Cover page, publisher's page, and pp. 179-184.

de Vincente et al. "Phosphate adsorption by fresh and aged aluminum hydroxide. Consequences for lake restoration," Sep. 2008 *Environ. Sci. Technol.* 42(17):6650-6655.

de Vincente et al. "Chemical interferences when using high gradient magnetic separation for phosphate removal: consequences for lake restoration," Sep. 15, 2011. *J. Hazard. Mater.* 192(3):995-1001. Available online on Jun. 15, 2011.

Dolar et al. "RO/NF treatment of wastewater from fertilizer factory-removal of fluoride and phosphate," Jan. 15, 2011 *Desalination* 265:237-241.

Dong et al. "Preparation and catalytic activity of Fe alginate gel beads for oxidative degradation of azo dyes under visible light irradiation," Oct. 25, 2011 *Catalysis Today* 175(1):346-355.

Draget et al. "Na- and K-alginate; effect on $Ca^{2+}$ gelation," Jan.-Feb. 1998 *Carbohydr. Polym.* 35:1-6.

Eaton et al., (Eds.), *Standard Methods for the Examination of Water and Wastewater, 21st ed.* American Public Health Assoc., Water Works Assoc., Water Environment Fed., Washington, D.C.; 2005. Cover page, title page and table of contents.

El-Temsah et al. "Ecotoxicological effects on earthworms of fresh and aged nano-sized zero-valent iron (nZVI) in soil," Sep. 2012 *Chemosphere* 89:6-82. Available online on May 15, 2012.

Emmerichs et al. "Interactions between alginate and manganese cations: identification of preferred binding sites," Apr. 2004 *Int. J. Biol. Macromol.* 34:73-79.

Fernandez et al. "Evidence for Fenton Photoassisted Processes Mediated by Encapsulated Fe ions at Biocompatible pH Values," Jun. 8, 2000 *J Phys. Chem. B* 104 (22):5298-5301. Available online on May 11, 2000.

Finotelli, et al. "Magnetic studies of iron(III) nanoparticles in alginate polymer for drug delivery applications," 2004 *Materials Science and Engineering C* 24:625-629. Available online Oct. 13, 2004.

Goebel et al. "Modifying polymer flocculants for the removal of inorganic phosphate from water," Oct. 12, 2011. *Tetrahedron Lett.* 52(41):5241-5244.

Gouider et al. "Integrated physicochemical and biological treatment process for fluoride and phosphorus removal from fertilizer plant wastewater," Aug. 2011 *Water Environ. Res.* 83(8):731-738.

Grant et al. "Biological interactions between polysaccharides and divalent cations: the egg-box model," May 15, 1973 *FEBS Lett.* 32:195-198.

Guan et al. "Competitive adsorption of organic matter with phosphate on aluminum hydroxide," Apr. 1, 2006 *J. Colloid Interface Sci.* 296(1):51-58. Available online on Oct. 17, 2005.

Hossain, et al., "Iron Cross-linked Biopolymer for Aqueous Phosphate Removal," Poster presented at *The Surface Water Treatment Workshop* Fargo, ND. Apr. 2010.

Hossain et al., "Iron Cross-linked Biopolymer for Aqueous Phosphate Removal," Poster. *North Dakota Water Quality Monitoring Conference, Bismarck State College and National Energy Center of Excellence,* Bismarck, North Dakota, Mar. 2014.

Hovey et al., "Sustainable Groundwater Remediation with Biopolymer Coated Nanoparticles," Abstract No. 60; Sustainable Environmental Nanotechnology Session of the *2012 World Environmental & Water Resources Congress* (American Society of Civil Engineers and Environmental & Water Resources Institute). Albuquerque, NM: May 20-24, 2012.

Huang et al. "Phosphate removal from wastewater using red mud," Oct. 1, 2008 *J. Hazard. Mater.* 158:35-42. Available online Feb. 1, 2008.

Hussain et al. "Orthophosphate removal from domestic wastewater using limestone and granular activated carbon," Apr. 15, 2011 *Desalination* 271(1-3):265-272.

Karageorgiou et al. "Removal of phosphate species from solution by adsorption onto calcite used as natural adsorbent," Jan. 31, 2007 *J. Hazard. Mater.* 139(3):447-452. Available online Apr. 4, 2006.

Kim et al. "Degradation of trichloroethylene (TCE) by nanoscale zero-valent iron (nZVI) immobilized in alginate bead," Apr. 15, 2010 *J. Hazard. Mater.* 176: 1038-1043. Available online on Dec. 4, 2009.

Kirschling et al. "Impact of nanoscale zero valent iron on geochemistry and microbial populations in trichloroethylene contaminated aquifer materials," May 1, 2010 *Environ. Sci. Technol.* 44:3474-3480. Available online on Mar. 30, 2010.

Krajangpan et al. "Nitrate Removal by Zero-valent Iron Nanoparticles Entrapped in Calcium Alginate," *International Symposium on Nanotechnology in Environmental Protection and Pollution (ISNEPP 2007).* Ft. Lauderdale, FL. Dec. 11-13, 2007.

(56) References Cited

OTHER PUBLICATIONS

Krajangpan et al. "Nitrate removal by entrapped zero-valent iron nanoparticles in calcium alginate," 2008 *Water Science & Technology*, 58(11):2215-22.

Krajangpan et al. "Iron Nanoparticles Coated with Amphiphilic Polysiloxane Graft Copolymers: Dispersibility and Contaminant Treatability," Sep. 18, 2012 *Environ. Sci. Technol.* 46(18):10130-10136. Available online on Jun. 25, 2012.

Li et al., "Adsorbed polymer and NOM limits adhesion and toxicity of nano scale zerovalent iron to *E. coli*," May 1, 2010. *Environ. Sci. Technol.* 44:3462-3467. Available online on Mar. 31, 2010.

Liu et al. "Phosphate bonding on non-crystalline Al/Fe-hydroxide co-precipitates," Aug. 1, 2011 *Environ. Sci. Technol.* 45:6283-6289. Available online on Jun. 30, 2011.

Machida-Sano et al. "In vitro adhesion of human dermal fibroblasts on iron cross-linked alginate films," Apr. 2009 *Biomed. Mater.* 4(2):025008; 8 pages. Available online on Mar. 4, 2009.

Martins et al. "Surface analysis of ProFile instruments by scanning electron microscopy and X-ray energy-dispersive spectroscopy: a preliminary study," Oct. 2002 *Int. Endod. J.* 35:848-853. Available online on Sep. 27, 2002.

Maxim et al. "Copper(II) and zinc(II) complexes with Schiff-base ligands derived from salicylaldehyde and 3-methoxysalicylaldehyde: Synthesis, crystal structures, magnetic and luminescence properties," Oct. 1, 2008 *Inorg. Chim. Acta.* 361:3903.

Mehrotra and Bohra (Eds), *Metal Carboxylates*. Academic Press: London, UK, 1983. Cover page, title page and table of contents.

Mezenner et al. "Kinetics and thermodynamic study of phosphate adsorption on iron hydroxide-eggshell waste," Apr. 15, 2009 *Chem. Eng. J.* 147(2-3):87-96.

Min et al. "Arsenate sorption by Fe(III)-doped alginate gels," Mar. 1, 1998 *Water Res.* 32:1544-1552.

Min et al. "Removal of Selenite and Chromate Using Iron(III)-Doped Alginate Gels," Mar.-Apr. 1999 *Water Environ. Res.* 71:169-175.

Mondal et al. "Removal of Selenite by Fe and NiFe Nanosized Particles," Aug. 4, 2004 *Ind. Eng. Chem. Res.* 43:4922-4934. Available online on Jul. 2, 2004.

Ogata et al. "Preparation of adsorbent for phosphate recovery from aqueous solutions based on condensed tannin gel," Aug. 30, 2011 *J. Hazard. Mater.* 192(2):698-703. Available online on May 27, 2011.

Papageorgiou et al. "Metal-carboxylate interactions in metal-alginate complexes studied with FTIR spectroscopy," Feb. 26, 2010. *Carbohydr. Res.* 345:(4):469-473. Available online on Dec. 16, 2009.

Pate, M. et al., "Regeneration of Zero-valent Iron Nanoparticles for Environmental Remediation," Abstract No. 61; Sustainable Environmental Nanotechnology Session of the *2012 World Environmental & Water Resources Congress* (American Society of Civil Engineers and Environmental & Water Resources Institute). Albuquerque, NM: May 20-24, 2012.

Phenrat et al. "Partial oxidation ("aging") and surface modification decrease the toxicity of nanosized zerovalent iron," Jan. 1, 2009. *Environ. Sci. Technol.* 43:195-200.

Quamme, Michael, "Selenium Removal from Surface and Groundwater: Exploratory Research with Iron Nanoparticles," *2012 World Environmental & Water Resources Congress* (American Society of Civil Engineers and Environmental & Water Resources Institute). Albuquerque, NM: May 20-24, 2012. Proceedings paper published by the American Society of Civil Engineers; Copyright 2012: pp. 146-150.

Saha et al., "Degradation of Groundwater Nitro-aromatics with Ferrous Iron and Nanoscale Zero-valent Iron in Presence of Hydrogen Peroxide," Abstract No. 883; Groundwater Remediation Technologies I Session of the *2012 World Environmental & Water Resources Congress* (American Society of Civil Engineers and Environmental & Water Resources Institute). Albuquerque, NM: May 20-24, 2012.

Saleh et al. "Ionic strength and composition affect the mobility of surface-modified Fe0 nanoparticles in water-saturated sand columns," May 1, 2008. *Environ. Sci. Technol.* 42:3349-3355. Available online on Apr. 5, 2008.

Seviour et al. "The microbiology of phosphorus removal in activated sludge processes—the current state of play," Apr. 2008 *J. Microbiol.* 46(2):115. Available online on Jun. 11, 2008.

Sharpley AN, Daniel T, Sims T, Lemunyon J, Stevens R, Parry R (2003) *Agricultural Phosphorus and Eutrophication (second ed.)* United States Department of Agriculture, Agricultural Research Service. pp. 1-38.

Shin et al. "Phosphate adsorption on aluminum-impregnated mesoporous silicates: surface structure and behavior of adsorbents," Feb. 1, 2004 *Environ. Sci. Technol.* 38:912-917. Available online on Dec. 20, 2003.

Smith, "Eutrophication of freshwater and coastal marine ecosystems: a global problem," Mar. 2003 *Environ. Sci. Pollut. Res. Int.* 10(2):126-139.

Sreeram et al. "Studies on the nature of interaction of iron(III) with alginates," Jan. 22, 2004 *Biochim Biophys Acta.* 1670(2):121-125.

Tanboonchuy et al. "Impact of selected solution factors on arsenate and arsenite removal by nanoiron particles," Jul. 2011. *Environ. Sci. Pollut. Res. Int.* 18(6):857-864. Available online on Jan. 21, 2011.

Tchobanoglous et al. *Wastewater Engineering: Treatment, Disposal, and Reuse, 4th Ed.* Metcalf & Eddy (Eds.). McGraw-Hill: New York, NY; 2003. Cover page, title page and table of contents.

Xiu et al. "Effect of bare and coated nanoscale zerovalent iron on *tceA* and *vcrA* gene expression in *Dehalococcoides* spp," Oct. 1, 2010. *Environ. Sci. Technol.* 44(19):7647-7651. Available online on Aug. 30, 2010.

Zhang et al. "Removal of selenate from water by zerovalent iron," Mar.-Apr. 2005 *J. Environ. Qual.* 34(2):487-495.

Bezbaruah, "Remediation of alachlor and atrazine contaminated water with zero-valent iron nanoparticles," 2009 *J. Environ. Sci. Health B.* 44(6):518-524. Available online on Jul. 13, 2009.

Liu et al., "TCE Dechlorination Rates, Pathways, and Efficiency of Nanoscale Iron Particles with Different Properties," 2005 *Environ. Sci. Technol.* 39(5):1338-1345. Available online on Jan. 6, 2005.

NDSU Research Foundation, "Groundwater Remediation with Recycling Capabilities," Invention Summary. [retrieved on Sep. 13, 2013]. Retrieved from the Internet <URL: http://www.ndsuresearchfoundation.org/greentech>.

Shabnam et al. "Contaminant diffusion and degradation studies with alginate encapsulated iron nanoparticles," Paper submitted for the *237th ACS National Meeting |Spring 2009—Division of Environmental Chemistry* (American Chemical Society). Salt Lake City, UT: Mar. 22-26. Submitted: ACS Salt Lake City, UT 2009.

\* cited by examiner

IRON-FUNCTIONALIZED ALGINATE FOR PHOSPHATE AND OTHER CONTAMINANT REMOVAL AND RECOVERY FROM AQUEOUS SOLUTIONS

This application claims the benefit of U.S. Provisional Application Ser. No. 61/791,202, filed Mar. 15, 2013, which is incorporated by reference herein.

STATEMENT OF GOVERNMENT RIGHTS

This invention was made with government support under Grant No. CMMI-1125674 awarded by the National Science Foundation. The government has certain rights in the invention.

BACKGROUND

Eutrophication of lakes and other natural bodies of water, caused by the presence of excess nutrients, is a growing problem. Phosphate is delivered to surface and ground water as a result of agricultural and feedlot run-offs, and municipal and industrial wastewaters. Treatment of domestic and agro-industrial wastewater often releases large amounts of phosphorus and nitrogen into water. Excess phosphorous concentration (>1.0 mg/L P) in water bodies causes eutrophication of aquatic ecosystems, which results in deterioration of water quality (Smith 2003). Therefore, it is important to reduce phosphorous concentrations in water to improve water quality.

On the other hand, phosphorus is essential for plant growth and is an important constituent of agricultural fertilizers. Phosphorous is typically obtained by mining inorganic phosphate rock, such as apatite, followed by chemical treatment to produce phosphoric acid, thereby generating phosphate. These natural supplies of inorganic phosphate are, however, diminishing. With increasing world population the demand of phosphorous for food production is estimated to peak sometime between 2030 and 2040. It is predicted that world phosphorous production will begin to decline around 2035. The consequent possible shortfall of phosphorous fertilizers is a major concern for global food security.

Methods for removing phosphate from agricultural, municipal and industrial wastewater are known, but they often result in the production of a solid, insoluble phosphate fraction that is not amenable to recycling or reuse (de-Bashan et al., 2004, Water Res 38:4222-4246).

SUMMARY OF THE INVENTION

Biodegradable materials, including iron-crosslinked alginate, are useful as a remediation agent for eutrophication caused by environmental contaminants such as phosphate. The biodegradable material is used in a form that allows contact with and adsorption of aqueous and dissolved ions, removing them from the aqueous medium such as a eutrophic lake or wastewater treatment plant effluent. After adsorbing the dissolved ions, for example phosphorous, the biodegradable material can be used as an agricultural fertilizer.

In one aspect, the invention provides a biodegradable material comprising iron-functionalized alginate. The iron-functionalized alginate can be Fe(II)-functionalized alginate. The biodegradable material can be formulated as a bead. The biodegradable material may include an entrapped nanoparticle. The biodegradable material can include a phosphorous-containing compound or a selenium-containing compound.

In another aspect, the invention provides a method for making a biodegradable material comprising iron-functionalized alginate. The method includes contacting sodium alginate with $FeCl_2$ under conditions and for a time effective to yield iron-functionalized alginate.

In yet another aspect, the invention includes a method for removing a contaminant from an aqueous medium where the aqueous medium is contacted with a biodegradable material comprising iron-functionalized alginate under conditions and for a time effective to sorb the contaminant. The method can further include collecting the used biodegradable material, wherein the used biodegradable material comprises a sorbed contaminant. The method can also include applying the used biodegradable material to soil as a fertilizer, wherein the used biodegradable material comprises a sorbed contaminant, and wherein the sorbed contaminant comprises a nutrient. The nutrient can include a phosphorous-containing compound, or a selenium-containing compound, or a combination thereof.

The contaminant can include a phosphorous-containing compound, a selenium containing compound, or arsenic. The contaminant can include orthophosphate ($PO_4^{3-}$), hydrogen phosphate ($HPO_4^{2-}$), dihydrogen phosphate, ($H_2PO_4^{-}$), magnesium ammonium phosphate ($MgNH_4PO_4.6H_2O$, struvite), hydroxyapatite, a polyphosphate, an organic phosphate, a selenate, Se(VI), $SeO_4^{-2}$, a selenite, Se(IV), $HSeO_3$, elemental selenium, a selenide, (Se-II), $Se^{2-}$, or $HSe^-$, or any combination thereof.

The aqueous medium can be a eutrophic lake, municipal and industrial wastewater, agricultural runoff, effluent from water or sewer treatment plants, acid mine drainage, sludge, groundwater, a reservoir, well water, a marsh, swamp, a bay, an estuary, a river, a stream, an aquifer, a tidal or intertidal area, a sea or an ocean. The pH of the aqueous environment can be higher than 7.5. The aqueous medium can be surface water, ground water, and aquifer, or well water.

The biodegradable material may be disposed within a stationary treatment medium, and the stationary treatment medium can include a permeable reactive barrier, a slurry wall, a filtration bed, or a filter.

In yet another aspect, the invention provides a method for increasing the nutrient content of a soil. The method includes applying a biodegradable material including iron-functionalized alginate and at least one sorbed nutrient, to a soil. The method may further include transporting the biodegradable material to the soil application site. At the application site, a plant disposed in the soil can take up at least one nutrient from the biodegradable material. The nutrient can include a phosphorous-containing compound, a selenium-containing compound, phosphorus, selenium, or iron, or a combination thereof. The nutrient can be released slowly over time as the biodegradable material degrades.

In another aspect, the invention includes a method for making a fertilizer. The method includes collecting from a remediation site a biodegradable material. The biodegradable material includes iron-functionalized alginate and at least one sorbed contaminant, where the contaminant includes a nutrient.

In yet another aspect, the invention provides a fertilizer composition including a biodegradable material. The biodegradable material includes iron-functionalized alginate and at least one sorbed contaminant, and the contaminant includes a nutrient. The nutrient can be a phosphorous-containing compound, or a selenium-containing compound, or a combination thereof.

The invention further includes a method for increasing the amount of bioavailable phosphorus, selenium or iron, or any combination thereof, in a soil. The method includes contacting the soil with a fertilizer composition comprising a biodegradable material comprising iron-functionalized alginate and at least one sorbed contaminant, wherein the contaminant comprises a nutrient. The nutrient can be a phosphorous containing compound or selenium containing compound, or combination thereof Also included in the invention is a method for making a fertilizer. The method includes identifying an aqueous medium that includes a nutrient comprising phosphorus-containing compound or a selenium-containing compound, or both. The method further includes contacting the aqueous medium with a biodegradable material comprising iron-functionalized alginate. The aqueous medium and the biodegradable material are contacted under conditions and for a time effective to sorb the nutrient onto the biodegradable material, yielding a charged biodegradable material. The method also includes incorporating the charged biodegradable material into a fertilizer composition.

Unless otherwise specified, "a," "an," "the," and "at least one" are used interchangeably and mean one or more than one.

DETAILED DESCRIPTION OF ILLUSTRATIVE EMBODIMENTS

Figure 2:
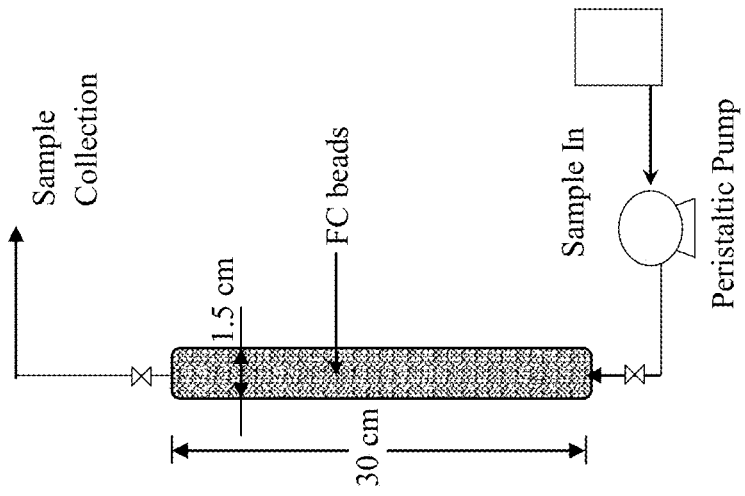
FIG. 2 shows a schematic of an FCA bead column setup.

The present invention provides a biodegradable material for the collection and sequestration of phosphates and other contaminants, particularly anionic contaminants, from contaminated aqueous environments. Advantageously, the phosphate and other compounds thereby collected can be recycled as an agricultural fertilizer. The invention thus provides for both environmental remediation/decontamination, as well as reuse of the recovered phosphate, thereby reducing the need for production of phosphate from apatite mining. This is a green technology that follows the principles of "reduce, reuse and recycle." It represents a sustainable practice that facilitates efficient recovery of used or wasted phosphates, and is well suited to the needs of the fertilizer industry, municipalities and pollution control agencies.

In one embodiment, the biodegradable material is, or includes, an iron-functionalized polymer. Preferably, in order to increase the green content and provide biodegradability, a natural polymer such as alginate, collagen, carboxymethylchitin, chitin, cellulose, pectin, agarose, chitosan, carrageenan and plant-derived gums. Synthetic polymers can be employed as well, in addition to or in place of natural polymers. Examples of suitable synthetic polymers include polyacrylate, poly(methyl methacrylate) (PMMA), polyvinyl acetate, and polyvinyl alcohol. In a preferred embodiment, the polymer contains at least one functional group, such as a carboxyl group or a hydroxyl group, to which a cation can bind. If the polymer does not contain a functional group then a desired functional group can be added chemically.

Alginates, natural polysaccharides obtained from brown marine algae and/or seaweed by collection, extraction, or otherwise, are particularly preferred for use in the invention because of their abundance, ease of use, and biocompatibility. Alginates are useful for water remediation because they are inexpensive, non-toxic, porous and biodegradable (Bezbaruah et al., J. Haz. Mat. 2009, 166:1339-1343; Bezbaruah et al., J. Nanopart. Res., 2011, 13:6673-6681). Alginates readily form complexes with cations such as sodium and calcium. In the presence of multivalent cations (e.g., calcium and iron) alginate undergoes a sol-gel transition due to the presence of carboxyl groups.

In a preferred embodiment, the biodegradable material is, or includes, an iron-functionalized alginate (referred to herein as Fe-alginate, Fe-functionalized alginate, or FFA). The iron-functionalized polymer of the invention is prepared by reacting a source of ionic iron (e.g., $Fe^{2+}$ or $Fe^{3+}$), such as ferrous chloride or ferric chloride, with the polymer, such as sodium alginate, to yield an iron-containing polymer. Preferably, $Fe^{2+}$ is used to functionalize the polymer. In this regard it should be noted that the examples refer to the iron-functionalized alginate of the invention as "iron-crosslinked alginate" (or FC alginate, or FCA). The term "crosslinked" is commonly used in the art to describe cation- or metal-functionalized polymers, such as alginates, particularly those functionalized with a polyvalent cation like $Ca^{2+}$, because of the presumed or observed interaction between the cation or metal and, for example, one or more acid or hydroxyl groups of the polymer. It is to be understood, however, that the iron-functionalized polymer of the invention is not limited by the type of association between the iron and the polymer. For example, the iron can be ionically bound to one or more negatively charged or partially negatively charged groups on the polymer, and/or it may be chelated, internalized, entrapped, encapsulated, covalently bound, or otherwise associated with the polymer. The iron (particularly $Fe^{2+}$ or $Fe^{3+}$) is preferably, but not necessarily, bound to or chelated with one or more carboxylic acid and/or hydroxyl groups of the polymer such that multiple polymer acid groups are linked together through the cation. Thus, unless otherwise stated to the contrary, the term "iron-crosslinked" as used in the examples and elsewhere herein is intended to be inclusive of any type of interaction between the iron and the polymer, such as alginate, that results from the synthesis of the iron-functionalized polymer according to methods described or referenced herein.

The iron-containing polymer of the invention can be Fe(II)-functionalized (using ferrous iron) or Fe(III)-functionalized (using ferric iron). Preferably, the iron-functionalized polymer is Fe(II)-functionalized alginate. The invention relates primarily to iron-functionalized alginate but it should be understood that other iron-functionalized polymers can be used in the same applications. Likewise, the invention relates primarily to Fe(II)-functionalized iron but it should be understood that iron of different valencies can be utilized for functionalizing the polymer if and when desired.

The biodegradable material can take the form of a sol, a gel, a hydrogel, a bead, a capsule, a particle or nanoparticle, a slurry, a matrix, or any other form that can be used in an aqueous environment to contact aqueous or dissolved ions.

In a preferred embodiment, the iron-functionalized alginate (FFA) is in the form of a bead. The FFA bead can be nanometer scale or millimeter scale; typically, the FFA bead (freshly synthesized) is millimeter scale, between 1 and 5 mm in diameter, more typically between about 2 and 4 mm in diameter. The diameter of the FFA bead decreases when the bead is dried. In some embodiment, the functionalized bead can entrap or encapsulate a remediation or decontamination agent, in which case it is optionally referred to as a capsule. In one embodiment, for example, an FFA bead synthesized in accordance with the methods described herein contains, within it, nanoparticles. The entrapped or encapsulated nanoparticles typically average between 20 and 200 nm in diameter, more typically between 50 and 100 nm in diameter. Without being bound by theory, it is believed that the nanoparticles found within the iron-functionalized alginate beads contain iron.

Prior to use, the FFA bead optionally contains chloride ions, derived from the synthesis using ferrous or ferric chloride. After use in a remediation or decontamination process, the FFA bead contains the contaminant, such as a phosphate.

FFA beads can be used directly as a remediation or decontamination agent, or they can be further modified to entrap or encapsulate other remediating or decontaminating agents including biological agents such as bioremediating microorganisms.

In addition to providing a biodegradable material such as an iron-functionalized polymer, more particularly iron-functionalized alginate, the invention provides compositions containing the iron-functionalized polymer and methods of making and using the iron-functionalized polymer.

The invention provides a method for making the iron-functionalized polymer of the invention. Sodium alginate is readily available as starting material for the synthesis of iron-functionalized alginate. In one embodiment of the method, sodium alginate is combined with ferrous chloride, $FeCl_2$. Sodium alginate can be added dropwise to a solution of $FeCl_2$ under conditions to produce Fe(II)-functionalized alginate according to methods described in the examples herein, as well as methods described in Kroll et al. (1996). FFA beads may contain carbon in an amount, for example, of 15-50 wt %, or 20-40 wt %, or 24-38 wt %. FFA beads may contain iron in an amount, for example, of 5-50 wt %, or 10-40 wt %. In some embodiments, the ratio of iron to carbon (Fe:C, w/w) in the FFA beads can be between 1:10 and 5:1. In some embodiments, for example, Fe:C (w/w) can be at least 1:10, or at least 1:5, or at least 1:2, or at least 1:1; in some embodiments, for example, Fe:C (w/w) can be less than 5:1, or less than 3:1.

Optionally, the process can be reversed, such that of $FeCl_2$ is added dropwise to a solution of sodium alginate. In the reverse process, oxygen is controlled in order to prevent further oxidation of the iron. The reverse process can be used to form alginate structures such as capsules, for example, that entrap the iron. Sodium alginate is typically provided an aqueous solution, for example between 0.5% and 5% w/v, more preferably between 1% and 3% w/v). Ferrous chloride is also typically provided as an aqueous solution, for example between 0.5% and 5% w/v, more preferably between 1% and 3% w/v), although other solvents can be included such as methanol. Additionally, in any method effective to make calcium-crosslinked alginate (Ca-crosslinked alginate), $FeCl_2$ can be substituted for $CaCl_2$ in order to produce Fe(II)-functionalized alginate. More generally, the procedures that are known to the art for production of calcium alginate from sodium alginate can be readily adapted for the production of iron-functionalized alginate.

Ferric chloride ($FeCl_3$) can be used in place of ferrous chloride to produce Fe(III)-functionalized alginate, if desired.

Iron-functionalized alginate can be formulated as beads using, for example a variable flow minipump (VWR) (see, e.g., Bezbaruah et al., J. Nanopart. Res., 2011, 13:6673-6681). Beads provide a convenient medium for recovery and reuse of the phosphate ion, because they can be readily stored, transferred, measured, dispersed, etc., although any desired formulation can be used, such as a gel, hydrogel, sol, matrix, slurry, etc. Advantageously, iron-functionalized alginate beads can be used as freshly produced or dried. Synthesis and production of the iron-functionalized alginate beads can be readily scaled up for industrial, municipal or commercial applications.

Removal of Phosphate and Other Contaminants with Iron-Functionalized Alginate

The biodegradable polymer of the invention, preferably iron-functionalized alginate, is used for removal of a contaminant from an aqueous medium. The contaminant, such as a phosphate or other anion, is sorbed onto the iron-functionalized alginate material, such as beads, and removed from the aqueous medium. In a preferred embodiment, the contaminant is a phosphorus (P)-containing compound, preferably a phosphorous-containing anion, such as orthophosphate ($PO_4^{3-}$), hydrogen phosphate ($HPO_4^{2-}$), dihydrogen phosphate, ($H_2PO_4^-$), magnesium ammonium phosphate ($MgNH_4PO_4.6H_2O$, struvite), hydroxyapatite, a polyphosphate and/or an organic phosphate. An example of another contaminant that can be removed is selenium, including selenate, Se(VI) (e.g., $SeO_4^{-2}$); selenite, Se(IV) (e.g., $HSeO_3^-$); elemental selenium, Se; or selenide (-II), (e.g., $Se^{2-}$, $HSe^-$). In yet another embodiment, the contaminant that can be removed is arsenic, particularly As (III) or As (IV).

Iron-functionalized alginate is contacted with a contaminated aqueous medium to remove phosphates and other contaminants, preferably other anionic contaminants. Phosphates that can be removed include, but are not limited to, orthophosphates, polyphosphates and organic phosphates. Contact can be static, as in a batch process, or can involve the flow of the aqueous media over or through the iron-functionalized alginate. Aqueous media can flow naturally over or through the iron-functionalized polymer of the invention, or the aqueous media to be decontaminated can be pumped over or through the iron-functionalized polymer. Iron-functionalized alginate can be used as an environmental remediation agent in remediation methods that are well-known to the art. For example, it can be injected into the soil, groundwater or a well, used as a matrix for a filtration mechanism, such as a cylinder, canister, or the like, applied as groundcover or into a trench, and/or utilized as a component of a deposit, layer, treatment zone, permeable or slurry wall or barrier, such as a permeable reactive barrier or slurry wall, filtration bed, or the like. Examples of aqueous media that can be decontaminated with the iron-functionalized alginate of the invention include eutrophic lakes, municipal and industrial wastewater, agricultural runoff, effluent from water or sewer treatment plants, mine waste including acid mine drainage (AMD), sludge, groundwater, reservoirs, well water, marshes, swamps, bays, estuaries, rivers, streams, aquifers, tidal or intertidal areas, seas, oceans and the like. Examples of aqueous media that may be high in phosphate and/or selenium include wastewater treatment plant effluent (WTPE) and animal feedlot effluent/runoff (AFLE).

The iron-functionalized alginate of the invention is well-suited for use in both large and small scale treatment facilities, as well as in field operations. In some embodiments, most (e.g., over 80%, or over 90%, or over 95%) of the phosphate is removed with the first 10-30 minutes of contact with the iron-functionalized alginate. When employed in or as a filter or in a filtration system, the detention or hydraulic retention time is therefore short (e.g., less than an hour, more preferably, less than 30 minutes), making the iron-functionalized beads of the invention well-suited for use in high flow systems (e.g., with high flow rate pumps). The high flow rates that can be used with the iron-functionalized polymers of the invention, together with their biodegradability and usefulness in both removal and recovery/reuse of contaminants, position these materials as ideally suited for use in any and all existing water and wastewater treatment applications.

We have shown that FFA beads are effective to remove phosphate from water after several hours of treatment, with little or no observed major interference from chloride, bicarbonate, sulfate, nitrate and natural organic matter. Iron-functionalized alginate (FFA) beads performed significantly better than calcium-crosslinked alginate (CCA) beads (with no iron). Moreover, FFA beads were shown to perform substantially equally well at pH 7, pH 8 and pH 9. This is important because the pH in eutrophic lakes is typically somewhat basic, ranging from 7.5 to 8.5 (Michaud, 1991). FFA is thus well suited for use in phosphate removal from eutrophic lakes. The adsorption capacity of FFA is also good, especially for batch treatment, but also for flow through treatments. Isotherm studies indicate that high amount of phosphate (typically, about 15 mg/g of dry FFA beads) can be removed using FFA (with up to 100% removal efficiency). Importantly the presence of other ions and materials/compounds (e.g., sulfate, chloride, nitrate, bicarbonate, natural organic matters) does not affect phosphate removal. With respect to pH, phosphate removal is also not impacted until pH reaches 9; this is significant because many eutrophic water bodies have high pH (e.g., 7.5-8.5). These results indicate that the FFA phosphate removal is very robust and can be used for most waters and wastewaters.

Recovery of Phosphate and Other Nutrients for Further Use

Iron-functionalized alginate that has been used to remove contaminants such as phosphorus and selenium that function as nutrients, i.e., which has sorbed the nutrient and thus is "charged" with phosphate or other nutrients, can be used as an agricultural fertilizer. Advantageously, as noted above, alginate is biodegradable; thus, used or spent FFA beads can be used directly as fertilizer, without the need for extracting the phosphate or other nutrient that has been sorbed onto the bead (although the invention also encompasses extraction or desorption of phosphate or other nutrient from the bead for use as or incorporation into a fertilizer, if desired). The phosphate or other nutrient bound by the FFA is bioavailable and accessible without further modification for plant and microbial uptake. The biodegradable beads release the nutrient, such as phosphate, as they degrade, making the nutrient bioavailable on a time release basis for plants and other organisms. Moreover, the iron present in iron-functionalized alginate is also bioavailable and accessible without further modification for plant and microbial uptake. As the beads degrade, iron is made bioavailable for plants and other organisms on a time release basis as well. Thus, charged FFA beads are expected to have utility as possible materials for slow release fertilizers. FFA beads can be applied in the field using any convenient method, either in the spring prior to planting, during the growing season, or in the fall. The FFA beads can be mixed with other nutrients, fertilizers, or additives, or applied separately. Illustrative compositions and methods for using recovered phosphate as fertilizer are described in de-Bashan et al., First International Meeting on Microbial Phosphate Solubilization, Developments in Plant and Soil Sciences Volume 102, 2007, pp 179-184.

The dual functionality of the iron-functionalized alginate beads of the invention makes them especially valuable. Not only are they useful in environmental remediation, decontamination, pollution control and the like but, when charged with a nutrient such as phosphate or selenium, they can be used as fertilizer. Advantageously, the iron present in the iron-functionalized alginate is also in bioavailable form. The new technology can thus be used to recover phosphates or other nutrients from eutrophic lakes, agricultural run-offs, and municipal and industrial wastewaters, and the like as detailed herein; after which the iron-functionalized beads with phosphate and/or other nutrients can be used as a fertilizer in agricultural fields as a source of phosphate/phosphorus.

EXAMPLES

The present invention is illustrated by the following examples. It is to be understood that the particular examples, materials, amounts, and procedures are to be interpreted broadly in accordance with the scope and spirit of the invention as set forth herein.

Example 1

Aqueous Phosphate Removal Using Iron-Functionalized Alginate

Iron (II) cross-linked alginate (FCA) biopolymer (referred to more generally herein as "iron-functionalized" alginate, or "FFA") was synthesized and investigated for phosphate removal. Phosphate was completely removed from water using the FCA beads in 12 h ($C_0=5$ mg $PO_4^{3-}$-P/L). The second order reaction model fitted well for the reaction and reaction rate constants were found to be 0.771 and $2 \times 10^{-4}$ per h for 5 and 100 mg $PO_4^{3-}$-P/L, respectively. Interference of $Cl^-$, $HCO_3^-$, $SO_4^{2-}$, $NO_3^-$ and natural organic matter (NOM) were investigated and no change in the removal efficiency of phosphate was observed. Maximum adsorption capacity was calculated as 14.77 mg/g of dry beads, and the experimental data were found to most closely fit Freundlich isotherm ($R^2=0.9078$). On electron microscopic examination, nanoparticles with average size of 83.65±42.83 (n=67) were observed inside the beads. For comparison purposes calcium cross-linked alginate entrapped NZVI (NCC) beads were also prepared. The NCC beads had a relatively very low phosphate removal rate and could completely remove $PO_4^{3-}$ after ~24 h ($C_0=5$ mg $PO_4^{3-}$-P/L) while FCA beads removed 100% $PO_4^{3-}$ in 12 h. Calcium cross-linked beads (CCC) (with no form of iron) could also remove $PO_4^{3-}$ to a great extent 88%, however they were saturated after ~8 h. The presence of iron increased the phosphate removal efficiency of NCC and FCA beads. Removal efficiency of $PO_4^{3-}$ by FCA beads was not affected when pH was changed (4-9). Column studies using 15 and 30 $PO_4^{3-}$-P/L showed sharp decrease of phosphate removal efficiency from 99 to 57% after 4 bed volume for the higher concentration. In the case of lower phosphate concentration (15 mg $PO_4^{3-}$-P/L), the removal decreased gradually (only about 5% in the first 6 bed volumes).

Phosphorus (P) is essential for plant growth, but excess P concentration (>1.0 mg/L P) in water bodies causes eutrophication of aquatic ecosystems resulting in deterioration of water quality (Smith 2003). Therefore, it is important to reduce P concentrations in water to improve water quality. On the other hand, with an increasing world population the demand of P for food production is estimated to peak sometime between 2030 and 2040 (Ashley et al., 2011), and it is imperative that P demand is met. While there is no opportunity to increase P supply from conventional sources (i.e., mining), alternative sources are worth exploring. Municipal wastewater, runoff from animal feedlot, agricultural runoff, and eutrophic lakes rich in phosphates can serve as nonconventional "mines" for P. The phosphates present in these aquatic sources are otherwise considered pollutants (causing eutrophication). Mining phosphates from these sources will, thus, offer viable solutions to both pollution and global food security issues.

The most common forms of P present in aqueous environments are orthophosphates, polyphosphates and organic phosphates (Mezenner and Bensmaili 2009). Orthophosphate is the most readily removable form of phosphate. Physical, chemical, biological and combination of these methods have been utilized to remove phosphorus from water (de-Bashan and Bashan 2004; Gouider et al., 2011; Mishra et al., 2010). While most of the methods can remove phosphate to a reasonable degree, adsorption is getting more attention in recent years as it is cost effective and the adsorbed phosphate can be recovered under the right environmental conditions. Different adsorbents have been used for aqueous phosphate removal which include oxides of iron, natural ores like calcite, and goethite (FeOOH), active red mud, and activated carbon (Chitrakar et al., 2006, Cordary 2008, Hussain et al., 2011, Karageorgiou et al., 2007, Yan et al., 2010a-b).

Alginate is a natural polysaccharide extracted from brown seaweed and composed of (1→4)-linked-d-mannuronic acid (M units) and -L-guluronic acid (G units) monomers.

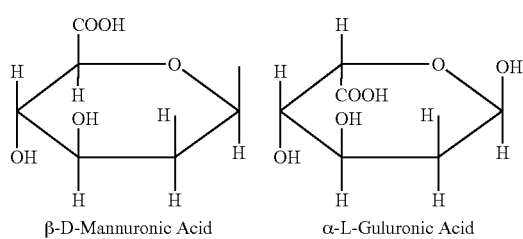

β-D-Mannuronic Acid     α-L-Guluronic Acid

In the presence of multivalent cations (e.g., calcium, and iron) the polymer undergoes a sol-gel transition because of the reactive carboxylate groups (Kroll et al., 1996). When alginate reacts with metal ions it forms stable organic-inorganic hybrid composite. Alginate polymers are widely investigated for water remediation because they are inexpensive, non-toxic, porous, and biodegradable (Bezbaruah et al., 2009, 2011). It has been used in water remediation as an immobilizing agent for nanoparticles (Bezbaruah et al., 2009, 2011).

Iron [Fe(III)] cross-linked alginate has been used as source of Fe catalyst for Fenton-enhanced decoloration/degradation of Orange II (Fernandez et al., 2000) and azo dyes (Dong et al., 2011). Sreeram et al. (2004) studied the interaction between iron (III) and alginate and suggested 'site binding model' where Fe(III) ions are bound to the binding sites in the alginate forming spatially separated iron(III) centers on the alginate backbone.

In this work, Fe-cross-linked alginate beads were synthesized and tested for their ability to remove phosphate from water. The effect of interfering ions on phosphate removal using Fe-cross-linked alginate beads was investigated as well.

Materials and Methods

Chemicals

Iron (II) chloride tetrahydrate ($FeCl_2 \cdot 4H_2O$, reagent grade, J. T. Baker), calcium chloride ($CaCl_2$, ACS grade, BDH), monopotassium phosphate ($KH_2PO_4$, 99% pure, EMD), sodium alginate (production grade, Pfaltz & Bauer), potassium nitrate ($KNO_3$, 99%, Alfa Aesar), sodium hydroxide (NaOH, ACS Grade, BDH), potassium sulfate ($K_2SO_4$, ACS grade, HACH), natural organic matter (Suwannee River NOM, RO isolation, IHSS), and humic acid (H1452, Spectrum) were used as received unless and otherwise specified.

Alginate Beads Synthesis

Figure 1:
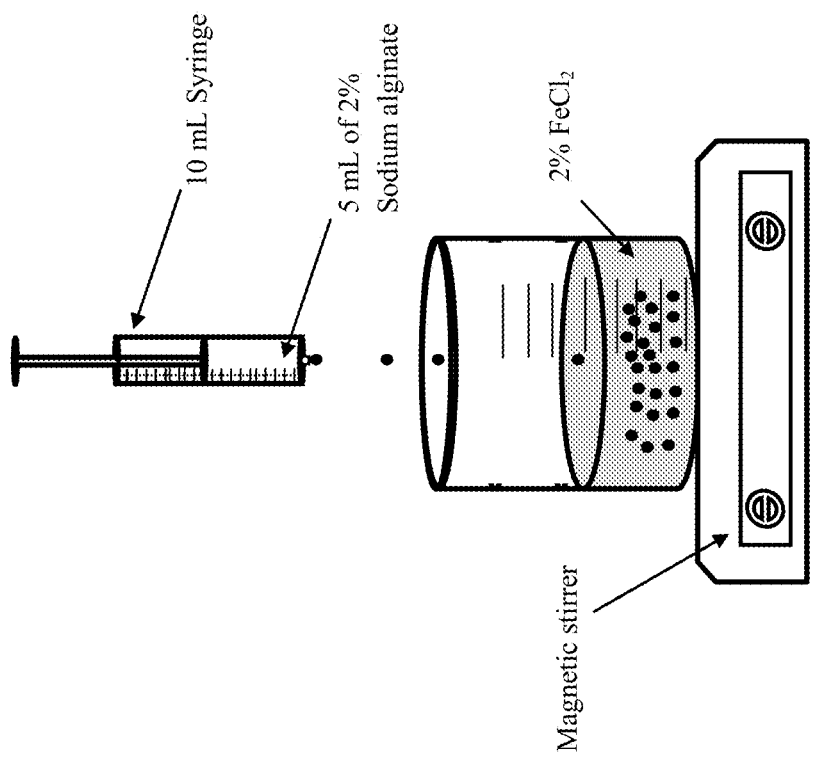
FIG. 1 shows a schematic of the procedure for synthesizing Fe-cross-linked alginate (FCA) beads.

Sodium alginate (20 g) was dissolved in 1 L of deionized (DI) water to form a 2% alginate solution. Fe-cross-linked alginate (FCA) beads were synthesized by adding the alginate solution to continuously stirred ferrous chloride ($FeCl_2$) solution (2% w/v) at room temperature (22±2° C.). The alginate solution was added drop wise into $FeCl_2$ solution using a 10-mL disposable plastic syringe (FIG. 1). FCA beads were prepared in batches using 5 mL alginate solution in each batch. Alginate beads are formed immediately as the alginate comes in contact with the ferrous chloride solution. The beads from each batch were kept separately in a polypropylene vial fitted with a plastic cap. Enough $FeCl_2$ solution was added to each vial to completely submerge the beads, and the beads in the vials were allowed to harden in $FeCl_2$ solution for an additional ~6 h. Calcium cross-linked alginate (CCA) beads were also synthesized for use in control studies as per Bezbaruah et al., (2009). The hardened beads were then washed with DI water and the excess water is sorbed with tissue papers before using them in experiments. If necessary the beads were stored in $FeCl_2$ solution in 20 mL vials and used in experiments with 24 h.

Entrapped NZVI Beads Synthesis

Entrapped NZVI was prepared using method described elsewhere (Bezbaruah et al., 2009), where 20 mg of NZVI was mixed with 5 mL of sodium alginate solution (2% w/v) in a 10 mL syringe. The content in the syringe was stirred vigorously for some time with a glass rod to ensure homogeneity. The NZVI-alginate mixture was then added drop wise into a 2% (w/v) deoxygenated solution of $CaCl_2$ at room temperature. NZVI-Ca-alginate (NCC) beads were formed as soon as the alginate drops came in contact with the $CaCl_2$ solution. The beads were kept in deoxygenated 2% $CaCl_2$ solution for additional ~6 h for hardening. The beads were then washed with deoxygenated DI water and sorbed the excess water with tissue papers before using them in experiments. If necessary the beads were stored in deoxygenated $CaCl_2$ solution in 20 mL vials (with $CaCl_2$ solution filled in completely to avoid any oxygen transfer) and used in experiments with 24 h.

Batch Studies
  Kinetic Studies:
  (a) NCC beads: Batch experiments were conducted using NCC beads. Beads produced in a single batch (0.121 g dry alginate and 20 mg NZVI in 50 mL or 2.42 g dry alginate/L and 0.4 g NZVI/L) were added to 50 mL phosphate solution (5 mg $PO_4^{3-}$-P/L) in multiple polypropylene plastic vials fitted plastic caps (reactors). Controls were run using CCA beads. The reactors and controls were rotated end-over-end at 28 rpm in a custom-made shaker to reduce mass transfer resistance. A set of sacrificial reactors was withdrawn at specific time intervals (0, 0.5, 2, 4, 6, 8, 12, 18, and 24 h). The phosphate concentration in the bulk solution was measured and reported as average (with standard deviations) of readings from three replicates. Ascorbic acid method (Eaton et al., 2005) was used for phosphate analysis. (b) FCA beads: Batch experiments were conducted using Fe-cross-linked alginate (FCA) beads (2.42 g dry alginate/L) using the same procedure described above (kinetic studies with CCA beads with entrapped NZVI). Blanks (no FCA or CCA beads but only $PO_4^{3-}$ solution) were also run.

Interference Studies:
  Removal of phosphate in the presence of selected ions as well as natural organic matter (NOM) found in surface waters were tried in batch experiments. Interference studies were carried out with known concentrations of chloride ($Cl^-$, 50 to 500 mg/L), bicarbonate ($HCO_3^-$, 10 to 100 mg/L), sulfate ($SO_4^{2-}$, 50 to 1000 mg/L), nitrate ($NO_3^-$, 10 to 100 mg/L as $NO_3^-$—N), and Suwanee River NOM (10 to 50 mg/L) using FCA and NCC beads with 5 mg/L of $PO_4^{3-}$ solution. The specific ion or NOM was mixed with the $PO_4^{3-}$ solution in a 50 mL plastic vial and one batch FCA beads was added to it. The reactors were then capped and placed in an end over end shaker (28 rpm) for 24 h. The batch studies were carried out at room temperature (22±2° C.) and triplicate reactors were run for each study.

Column Studies

Column studies were conducted to simulate a real world application of the FCA beads for $PO_4^{3-}$ removal. Two concentrations of $PO_4^{3-}$ were used in the column studies (15 and 30 mg $PO_4^{3-}$-P/L) to simulate extreme conditions. Glass columns (height 30 cm and internal diameter 1.5 cm) with an empty bed volume of 53 mL were used. Each column was filled with FCA beads (made with 1.2 grams alginate) and had a packed bed volume of 27 mL. $PO_4^{3-}$ solution was fed in an up-flow mode using a peristaltic pump at a flow rate of ~0.1 mL/min. Samples were collected over time from the effluent point at the top of the column (FIG. 2) and analyzed for $PO_4^{3-}$ concentration.

Alginate Beads Characterization

Scanning electron microscopy along with energy dispersive spectroscopy (SEM/EDS, JEOL JSM-6300, JEOL Ltd.) was used to observe surface morphology and characterize the elemental composition of the beads. SEM analyses were performed in a wide beam current range to determine the microstructure of the dry FCA beads before (new FCA beads) and after using them for $PO_4^{3-}$ removal (used FCA beads). New and used beads were dried overnight in a vacuum oven under nitrogen environment, and cross sectional samples of the dry beads were used for imaging and EDS analyses.

Results and Discussion
Synthesis and Characterization of Alginate Beads

Figure 3:
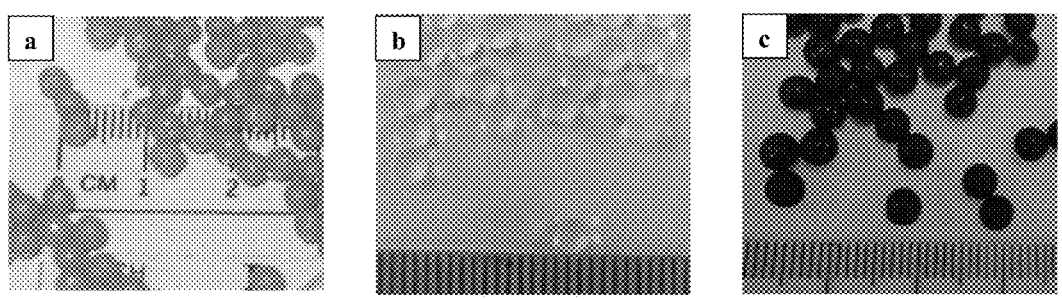
FIG. 3 shows images of the synthesized (a) FCA beads, (b) Ca-cross-linked alginate (CCA) beads, and (c) Nanoscale zero-valent iron (NZVI) entrapped Ca-cross-linked alginate (NCC) beads.

FCA, CCA, and NCC beads were synthesized successfully (FIG. 3). All the beads were approximately spherical in shape with average diameters of 3.09±0.16 (FCA), 3.02±0.04 (CCA), and 4.55±0.88 mm (NCC). Similar bead size and shape was reported for NCC by Bezbaruah et al., (2009). Average number of beads produced per batch was 124±4 (n=5) for FCA and CCA beads and 53±10 (n=5) for NCC beads. For NCC beads, there was a possibility that some NZVI particles might have been left behind in the syringe and that would result in erroneous interpretations of the results. The loss of NZVI was accounted for by rinsing the syringe with copious amount of deoxygenated DI water and measuring the weight of iron particles in the rinse water as per Bezbaruah et al. (2009). The rinsed iron particles were dried overnight in a vacuum oven in nitrogen environment. The average amount leftover iron (not entrapped) was found to be 0.0007 g (out of total 0.02 g) which corresponds to an error of 3.5%.

To calculate the dry weights of the beads, the beads were dried overnight in a vacuum oven in nitrogen environment. Each batch of dry FCA beads weighted 0.121±0.002 g, while dry CCA and NCC beads weighed 0.155±0.025 g and 0.224±0.016 g, respectively.

Figure 4:
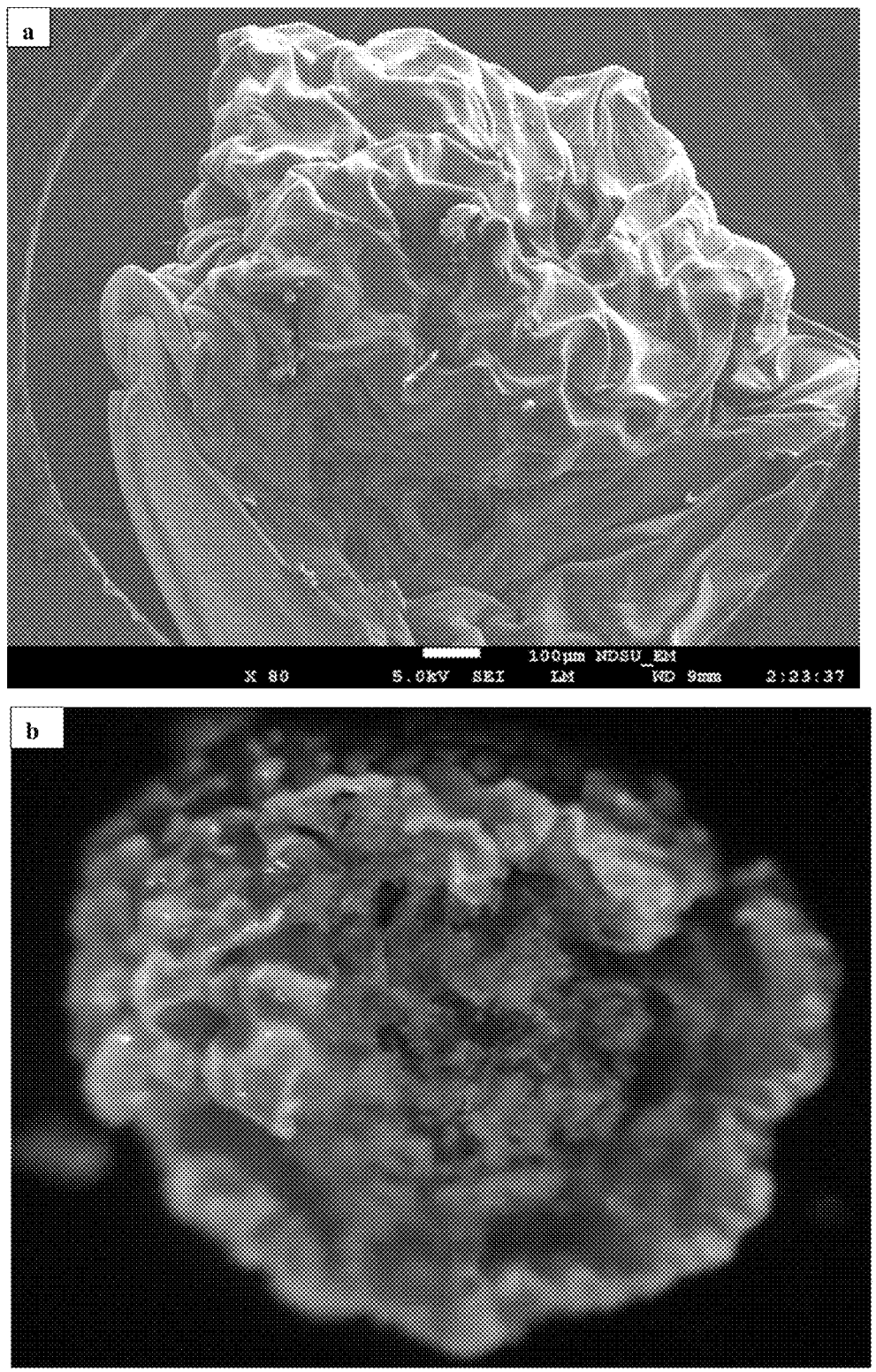
FIG. 4 shows (a) scanning electron microscopy (SEM) image of the surface of a fresh dry FCA bead, (b) light microscope image of an used FCA bead, (c and e) SEM image of the cross-section of the center of a fresh dry FCA bead, (d and f) SEM image of the cross-section of the center of an used dry FCA bead, (g) energy-dispersive spectroscopy (EDS) spectrum of one point of a fresh FCA bead, and (h) EDS spectrum of one point of an used FCA bead.
Figure 4:
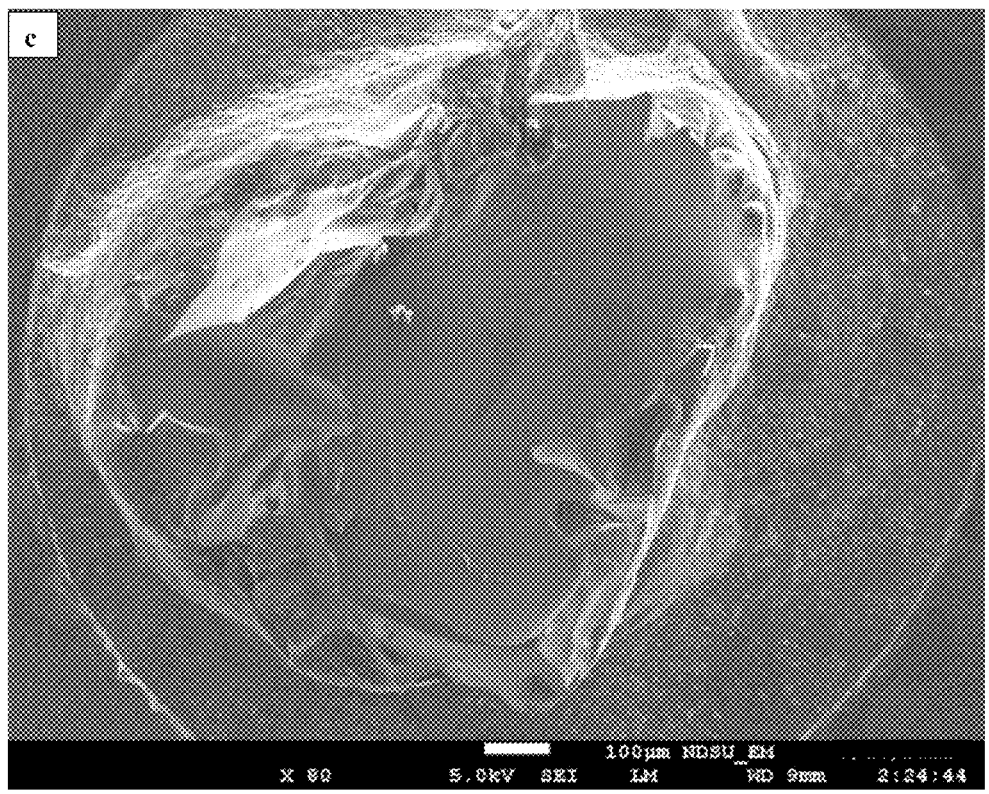
Figure 4:
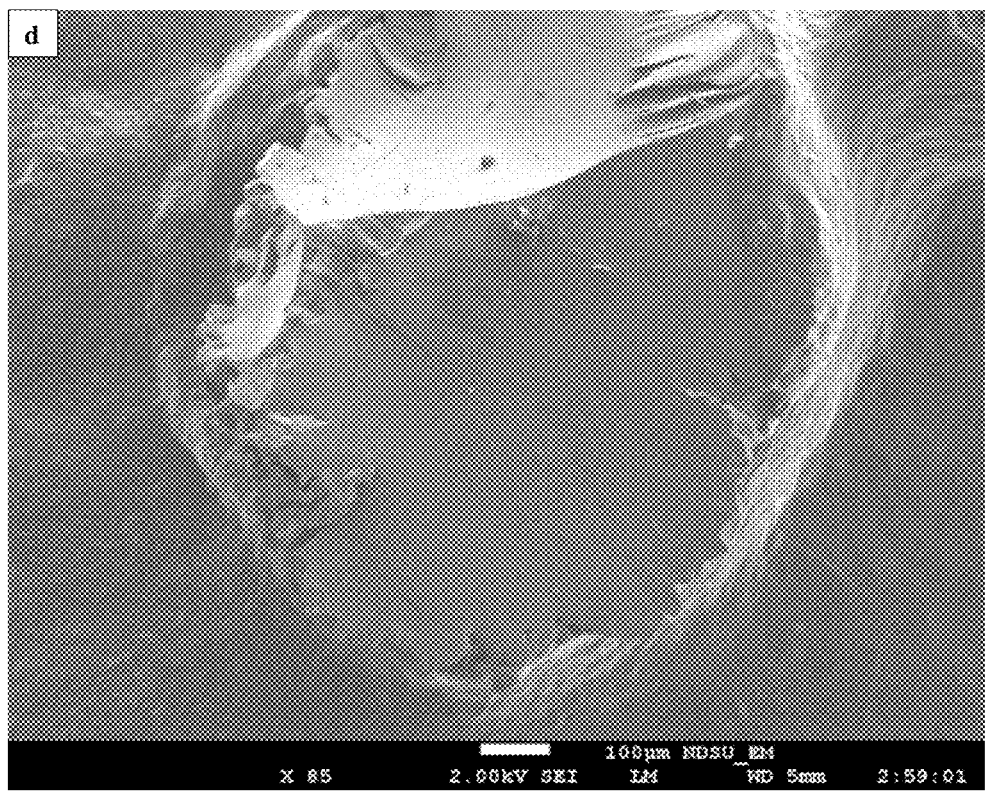
Figure 4:
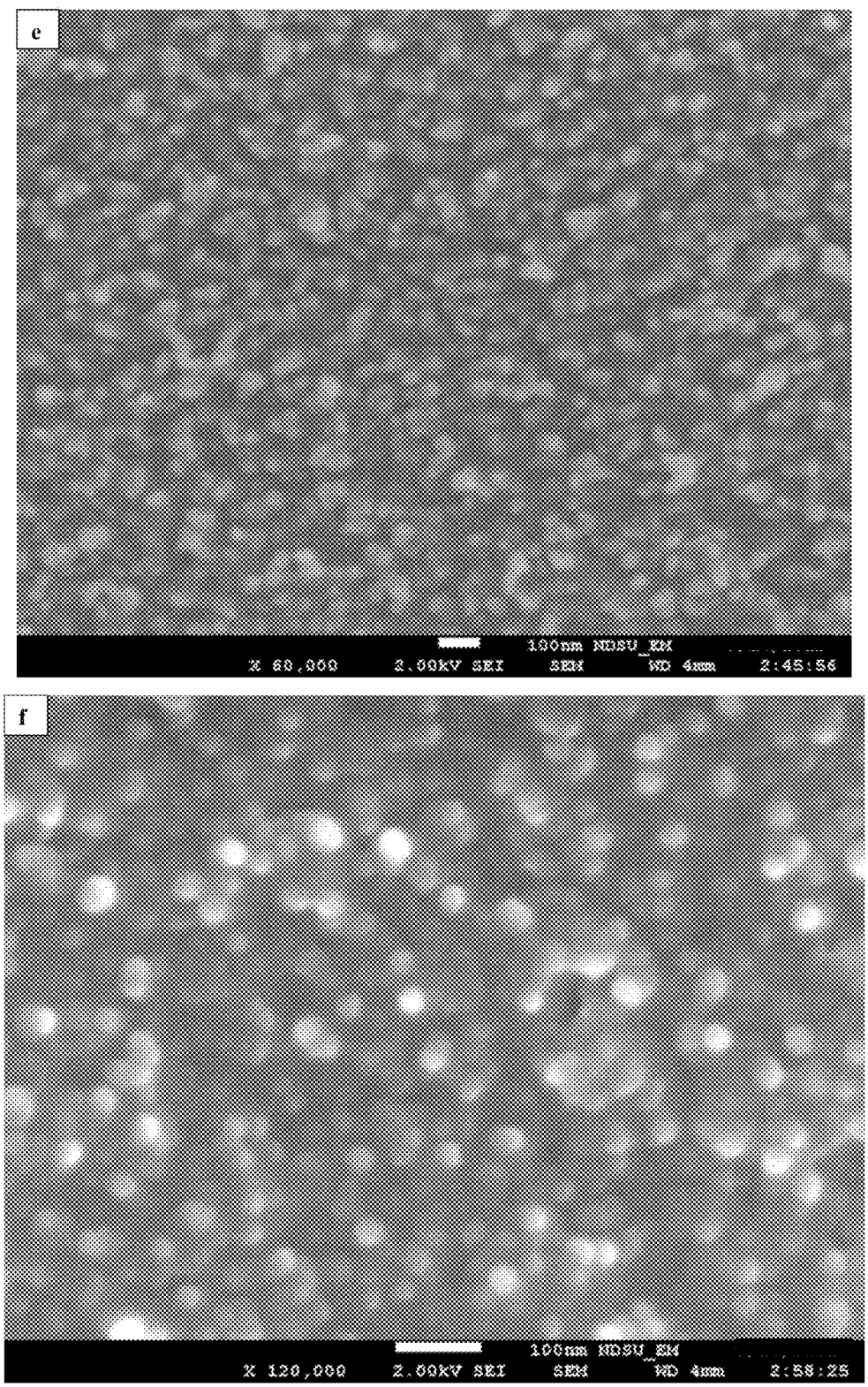
Figure 4:
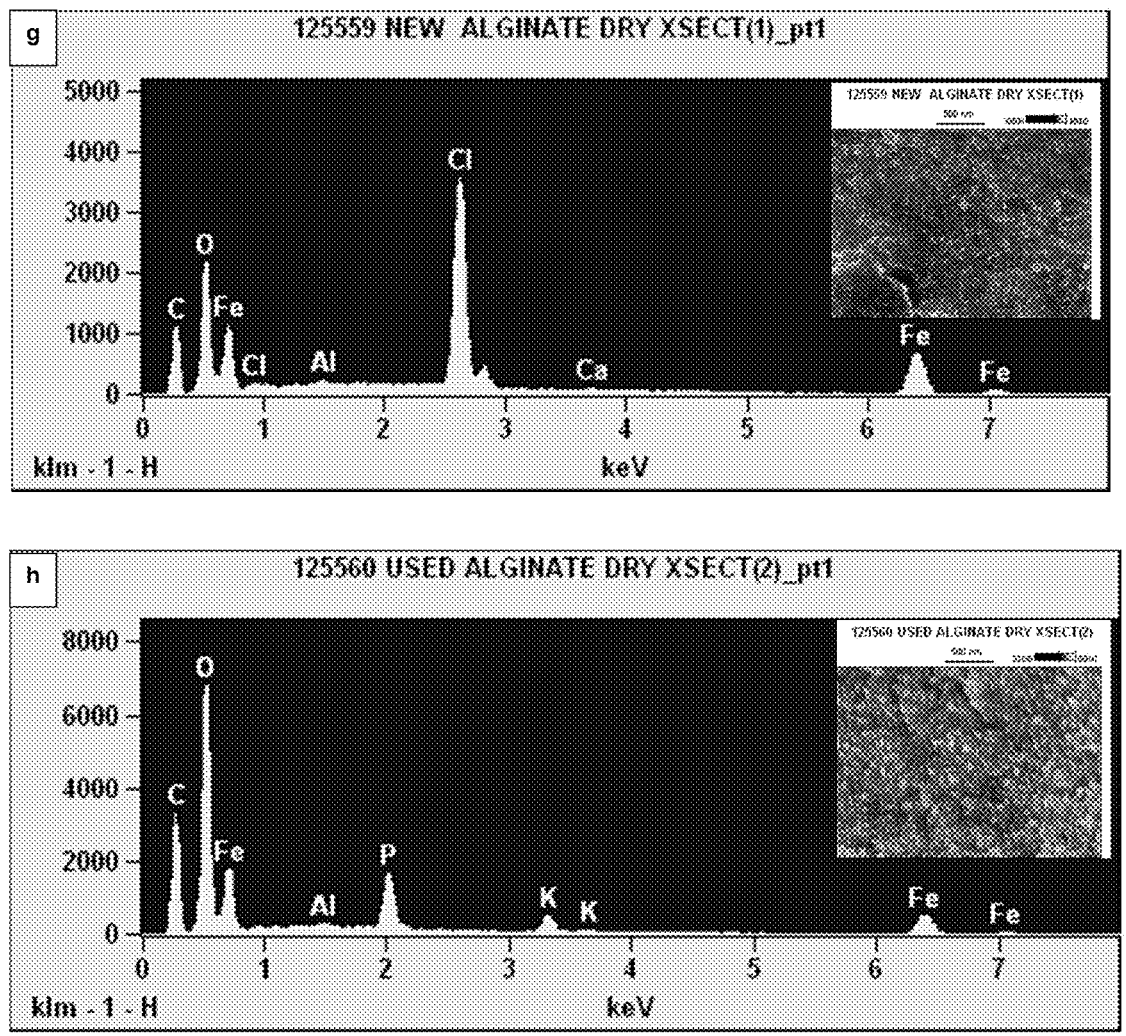

The size of the dry FCA beads was ~1 mm and the dry beads had a uniform hard texture (FIGS. 4a and b). Nanoparticles with average size of 74.45±35.60 nm (n=97) were observed inside the fresh beads (FIG. 4e). The surface morphology of the beads changed completely once phosphate was adsorbed (fresh bead in FIG. 4c and used bead in FIG. 4d). A fragile outer layer was formed around the hard core after phosphate was adsorbed (FIG. 5d). The size of nanoparticles increased marginally after phosphate adsorption. The average size of nanoparticles was 83.65±42.83 nm (n=67) inside the used beads (FIG. 4f). Nanoparticle size was measured using ImageJ software.

Energy-dispersive spectroscopy (EDS) analysis of fresh (FIG. 4g) and the used beads (FIG. 4h) revealed a consistent carbon weight % and similar iron weight % except for one point in the fresh beads which indicates heterogeneous distribution of iron inside the beads. Chloride (~30%) present in the fresh beads was not observed in the used beads. It is suspected that the nanoparticles are some form of iron but further investigations are needed to completely characterize the particles.

Batch Studies
Kinetic Studies

Figure 5:
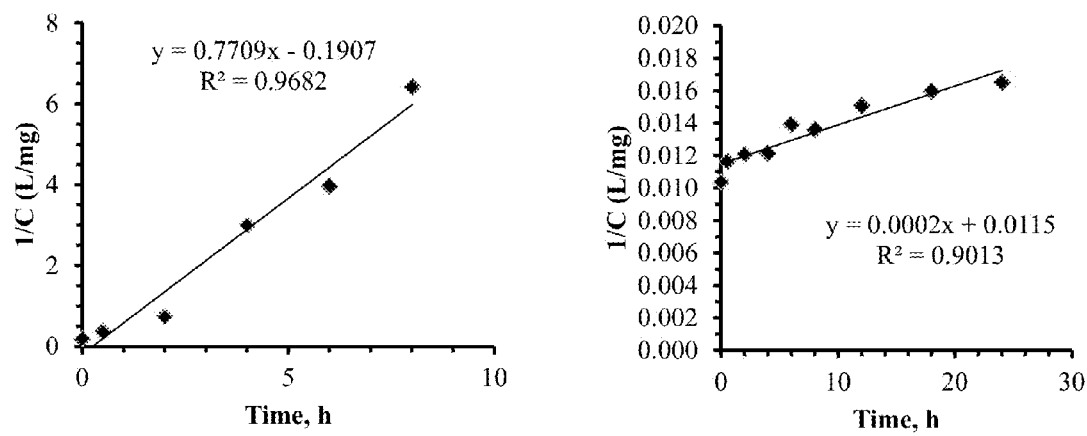
FIG. 5 shows best fit second order reaction rate equations for 5 mg $PO_4^{3-}$-P/L removal by FCA beads (left) and 100 mg $PO_4^{3-}$-P/L removal by FCA beads (right) plotted as a function of time.

Batch experiments were conducted to determine the kinetic parameters for $PO_4^{3-}$ removal ($C_0$=5 and 100 mg $PO_4^{3-}$-P/L) with FCA beads. Zero, first, and second order reaction equations were fitted to determine the type of reaction and reaction rate constants (FIG. 5).

Figure 6:
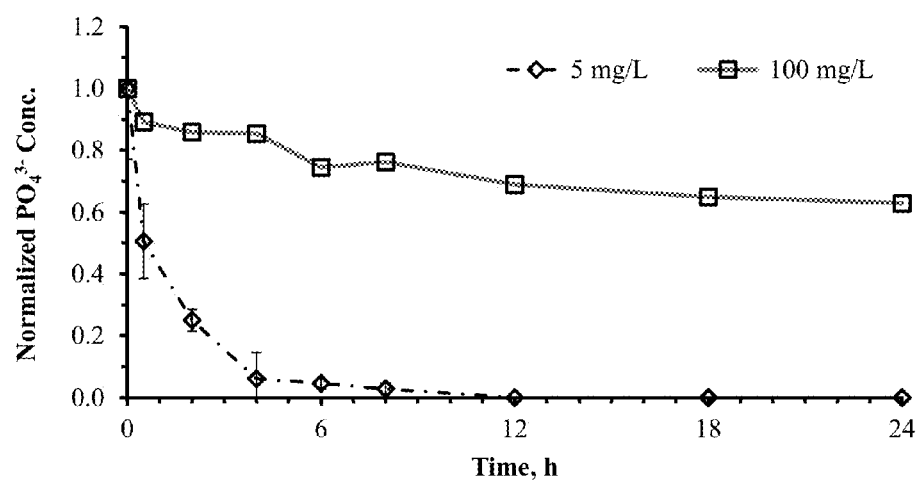
FIG. 6 shows phosphate removal over time using FCA beads, $C_0$=5 and 100 mg $PO_4^{3-}$-P/L.

The second order reaction model fitted better for both the concentrations and observed reaction rates were found to be 0.771 and 2×10−4 per h for 5 and 100 mg $PO_4^{3-}$-P/L, respectively. Even though complete removal of $PO_4^{3-}$ was observed within ~12 h (FIG. 6, the curve achieved a plateau after that), a contact time of 24 h was chosen to conduct the rest of the FCA experiments to ensure completion of the reactions.

Comparison Between Bare NZVI, FCA, and NCC

Removal of $PO_4^{3-}$ using FCA, CCA, and NCC beads was compared (FIG. 8) in this study while work on bare NZVI has been reported elsewhere (Almeelbi and Bezbaruah, 2012).

Bare NZVI particles have high $PO_4^{3-}$ removal rate (96-100% phosphate in 30 min, Almeelbi and Bezbaruah 2012) but the spent NZVI particles are difficult to be recovered from the environment after $PO_4^{3-}$ sorption has taken place. There are concerns about ecotoxicity of NZVI (El-Temsah and Jones, 2012; Kirschling et al., 2010, Phenrat et al., 2009). Entrapment of NZVI in alginate (NCC beads) allows for better post-use collection of NZVI. NCC beads had a relatively low removal rate and could completely remove $PO_4^{3-}$ after ~24 h. However, FCA beads removed $PO_4^{3-}$ faster and achieved 100% removal at ~12 h. It is important to note that CCA beads (with no form of iron) could sorb $PO_4^{3-}$ to a great extent 88% but was saturated after ~8 h. The presence of iron increased the removal efficiency in case of NCC and FCA beads (Table 1).

Isotherm Studies

A set of experiments were conducted to understand the isotherm behavior of the FCA beads during $PO_4^{3-}$ removal. One batch of FCA beads was used in each batch reactor and

TABLE 1

Reaction rate constants calculated based on the obtained results

|  | $C_o$ | $C_e$ | Equilibrium time | Zero Order | | First Order | | Second Order | |
|---|---|---|---|---|---|---|---|---|---|
|  | mg/L | | h | $K_{obs}$* | $R^2$ | $K_{obs}$** | $R^2$ | $K_{obs}$*** | R |
| FCA | 5 | 0 | 12 | 0.5402 | 0.6728 | 0.4369 | 0.931 | 0.7709 | 0.9682 |
| CC | 5 | 0.72 | 8 | 0.1344 | 0.4115 | 0.0741 | 0.5791 | 0.0578 | 0.7914 |
| NCC | 5 | 0 | 24 | 0.1987 | 0.4295 | 0.1349 | 0.7766 | 0.1633 | 0.9868 |
| Bare NZVI[#] | 5 | 0 | 2 | 4.06 | 0.3487 | 2.3633 | 0.4044 | 3.3441 | 0.5443 |

*mg/L/min; per min; *L/mg/min; [#]Based on data presented in Almeelbi and Bezbaruah (2012).

Effect of Interfering Ions

Effect of the presence of $Cl^-$, $HCO_3^-$, $SO_4^{2-}$, $NO_3^-$ and NOM on $PO_4^{3-}$ ($C_0$=5 mg $PO_4^{3-}$-P/L) removal efficiency of FCA beads was examined. No interference in the removal of $PO_4^{3-}$ was observed because of the presence of these ions (Table 2). The ions used in this interference study are usually present in wastewater, surface water, and groundwater. Lee et al. (2011) reported a 78% reduction in $PO_4^{3-}$ removal by slag microspheres in the presence of $HCO_3^-$. The addition of $SO_4^{2-}$ was reported to decrease the $PO_4^{3-}$ removal efficiency by ~60% in a polymer-based nanosized hydrated ferric oxides system (Pan et al., 2009), and the efficiency reduction was 24.5% when layered double hydroxides were used (Das et al., 2006). $SO_4^{2-}$ and $Cl^-$ were found have a negative impact on $PO_4^{3-}$ removal from lake water using high gradient magnetic separation (Vicente et al., 2011). In the presence of $NO_3^-$, $PO_4^{3-}$ removal decreased by 29.2% while using layered double hydroxides (Das et al., 2006) and by 6.27% while using NZVI (Almeelbi and Bezbaruah, 2012). NOMs are present in surface waters, and known to interfere with $PO_4^{3-}$ removal in adsorption processes (Guan et al., 2006, Vicente et al., 2008). However, no effect of NOM on $PO_4^{3-}$ removal was observed in this study. Similar findings were reported earlier with bare NZVI (Almeelbi and Bezbaruah, 2012). The lack of interference by the dominant ions and NOM makes an FCA bead system a potential candidate for field application for $PO_4^{3-}$ removal.

TABLE 2

Phosphate removal percentages in the presence of different concentration of interfering ions, C0 = 5 mg/L, contact time = 24 h

| Ion | Concentration, mg/L | % Phosphate Removal |
|---|---|---|
| $SO_4^{2-}$ | 50 | 100 |
|  | 100 | 100 |
|  | 1000 | 99.3 |
| $NO_3^-$ | 10 | 100 |
|  | 50 | 99.3 |
|  | 100 | 99.7 |
| $HCO_3^-$ | 5 | 100 |
|  | 10 | 99 |
|  | 50 | 99.5 |
| $Cl^-$ | 50 | 100 |
|  | 100 | 98 |
|  | 1000 | 99.7 |
| NOM | 5 | 100 |
|  | 10 | 100 |
|  | 50 | 100 |

$PO_4^{3-}$ in the bulk solution was analyzed after 24 h to calculate the sorption capacity of FCA beads (Eq. 1). Initial concentration of phosphate was varied from 5 to 100 mg/L.

$$q = \frac{(C_0 - C_e) \times V}{m} \quad (1)$$

Where q is the unit mass (mg) of $PO_4^{3-}$-P per g of dry FCA bead, $C_0$ and $C_e$ are the initial and equilibrium concentrations of $PO_4^{3-}$-P in mg/L, V is the volume of $PO_4^{3-}$ solution in mL and m is mass of dry FCA beads in g.

Figure 8:
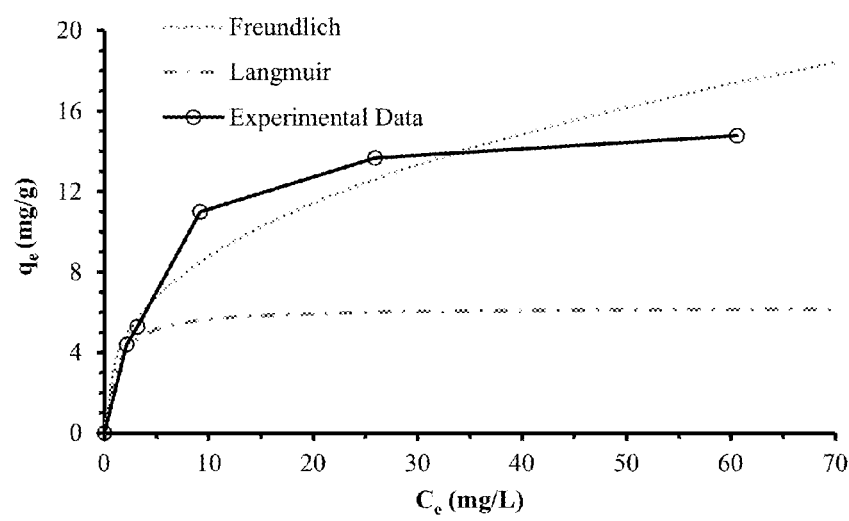
FIG. 8 shows Freundlich and Langmuir isotherms models for $PO_4^{3-}$ removal by FCA beads

The Freundlich isotherm was found to most closely fit with experimental data ($R^2$=0.9078, FIG. 8). Maximum adsorption capacity was found to be 14.77 mg/g of dry FCA beads. Others (Chitrakar et al., 2006; Ogata et al., 2011) have reported that Freundlich describes sorption behavior better when dual sorbents (alginate and iron in this study) are present. Freundlich isotherm model has been used to describe $PO_4^{3-}$ adsorption behavior onto sulfate-coated zeolite, hydrotalcite, and activated alumina while the adsorption behaviors of the same materials without coating were described better by Langmuir isotherm model (Choi et al., 2012).

Effect of pH

Figure 9:
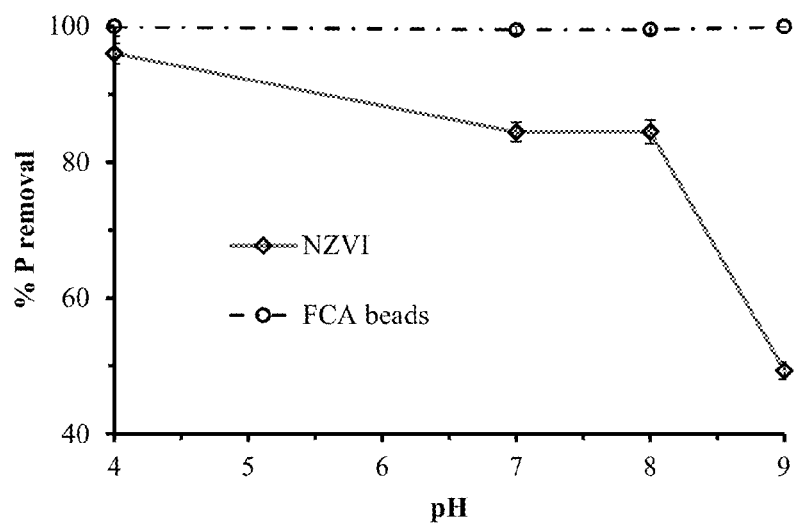
FIG. 9 shows $PO_4^{3-}$ removal using FCA beads and NZVI at pH 4, 7, and 9 ($C_0$=5 mg $PO_4^{3-}$-P/L, Run time=30 min).

The effect of pH on phosphate removal ($C_0$=5 mg $PO_4^{3-}$-P/L) by FCA was investigated at pH of 4, 7, 8 and 9, and the results were compared with those obtained from similar tests with bare NZVI (FIG. 9).

Changing the pH did not affect removal of $PO_4^{3-}$ by FCA beads, and 100% removal was achieved in all pH values. However, $PO_4^{3-}$ removal by bare NZVI was reported decreased with increasing pH as theorized by Almeelbi and Bezbaruah, 2012. The most marked decrease was observed between pH 8 and 9. Removal efficiency of $PO_4^{3-}$ decreased from 84% at pH 8 to 49% at pH 9. It should be noted that the point of zero charge (PZC) for bare NZVI was ~7.7 (Giasuddin et al., 2007). That pH did not affect the $PO_4^{3-}$ removal efficiency of FCA has important practical implications. The pH in eutrophic lakes ranges from 7.5 to 8.5 (Michaud, 1991) and FCA can possibly be used for phosphate removal in eutrophic lakes.

Column Studies

Figure 10:
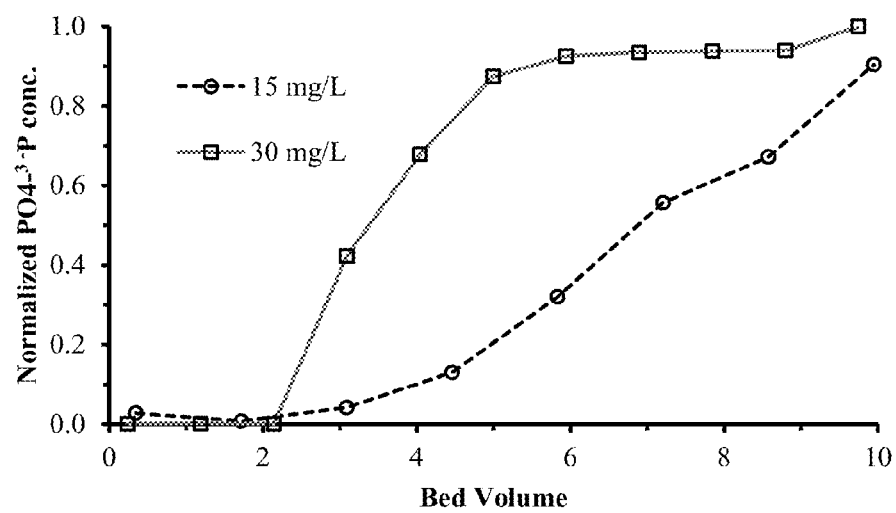
FIG. 10 shows FCA bead column study results ($C_0$=15 and 30 mg $PO_4^{3-}$-P/L).

Breakthrough behavior in FCA bead columns was studied with 15 and 30 mg $PO_4^{3-}$-P/L and a flow rate of ~0.1 mL/min. (FIG. 10). For the higher concentration (30 mg $PO_4^{3-}$-P/L), the breakthrough ($C_e$=0.05 $C_0$) was achieved after 2 bed volumes when removal dramatically decreased from 99 to 57%. In the case of the lower concentration (15 mg $PO_4^{3-}$-P/

L) removal decreased gradually in the first 3 bed volumes (only ~5% decrease). The adsorption capacity increased from 0.97 to 1.81 mg/g of dry beads when initial $PO_4^{3-}$-P concentration was increased from 15 to 30 mg $PO_4^{3-}$-P/L which is much lower than the adsorption capacity obtained in batch study (14.77 mg/g of dry FCA beads).

Conclusions

Figure 7:
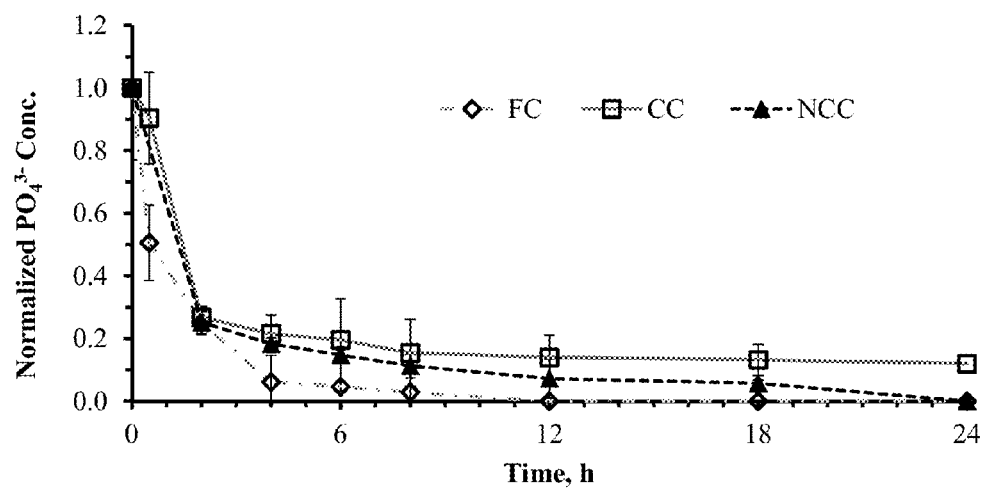
FIG. 7 shows phosphate removal over time using FCA, CCA, and NCC beads, $C_0$=5 mg $PO_4^{3-}$-P/L.

Ferrous iron cross-linked alginate (FCA) beads were successfully synthesized and utilized for phosphate removal. Complete (100%) removal of aqueous phosphate was achieved after 12 h. The comparison between the three types of alginate based sorptive media (viz., Fe-cross-linked alginate/FCA, Ca-cross-linked alginate/CCA, and NZVI entrapped in Ca-cross-linked alginate/NCC) revealed that FCA media/beads works much better for phosphate removal. Further, there was no interference by $Cl^-$, $HCO_3^-$, $SO_4^{2-}$, $NO_3^-$ and NOM in phosphate removal with FCA beads. Freundlich isotherm could best describe the phosphate sorption behavior of FCA beads. It was inferred (see FIG. 7) that presence of iron in alginate beads increased the phosphate removal capacity of the beads.

References

Almeelbi T, Bezbaruah A N (2012) Aqueous phosphate removal using nanoscale zero-valent iron. Journal of Nanoparticle Research, 14(7), 1-14

Ashley K, Cordell D, Mavinic D (2011) A brief history of phosphorus: From the philosopher's stone to nutrient recovery and reuse. Chemosphere 84 (6):737-746.

Bezbaruah A N, Krajangpan S, Chisholm B J, Khan E, Bermudez J J E (2009) Entrapment of iron nanoparticles in calcium alginate beads for groundwater remediation applications. Journal of Hazardous Materials 166 (2-3):1339-1343.

Bezbaruah A N, Shanbhogue S S, Simsek S, Khan E E (2011) Encapsulation of iron nanoparticles in alginate biopolymer for trichloroethylene remediation Journal of Nanoparticle Research 13:6673-6681.

Chitrakar R, Tezuka S, Sonoda A, Sakane K, Ooi K, Hirotsu T (2006) Phosphate adsorption on synthetic goethite and akaganeite. Journal of Colloid and Interface Science 298 (2):602-608.

Choi J W, Lee S Y. Lee S H. Kim J E. Park K Y. Kim D J. Hong S W (2012) Comparison of Surface-Modified Adsorbents for Phosphate Removal in Water. Water Air and Soil Pollution. 223 (6), 2881-2890.

Cordary A (2008) Phosphorus removal characteristics on biogenic ferrous iron oxides. Washington State University, USA, USA de Vicente I, Merino-Martos A, Guerrero F, Amores V, de Vicente J (2011) Chemical interferences when using high gradient magnetic separation for phosphate removal: Consequences for lake restoration. Journal of Hazardous Materials. 192 (3): 995-1001 de-Bashan L E, Bashan Y (2004) Recent advances in removing phosphorus from wastewater and its future use as fertilizer (1997-2003). Water Research 38 (19):4222-4246.

Dong Y C, Dong W J, Cao Y N, Han Z B, Ding Z Z (2011) Preparation and catalytic activity of Fe alginate gel beads for oxidative degradation of azo dyes under visible light irradiation. Catalysis Today 175 (1):346-355.

Eaton A D, Franson M A H, Association A W W, Federation WE (2005) Standard methods for the examination of water and wastewate. 21st edn. American Public Health Association, Washington, D.C.

El-Temsah Y S, Joner E J, (2012) Ecotoxicological effects on earthworms of fresh and aged nano-sized zero-valent iron (nZVI) in soil. Chemosphere. 89, 76-82.

Fernandez J, Dhananjeyan M R, Kiwi J, Senuma Y, Hilborn J (2000) Evidence for Fenton photoassisted processes mediated by encapsulated Fe ions at biocompatible pH values. Journal of Physical Chemistry B 104 (22):5298-5301. doi: 10.1021/jp9943777

Giasuddin A B M, Kanel S R, Choi H (2007) Adsorption of humic acid onto nanoscale zerovalent iron and its effect on arsenic removal. Environ Sci Technol 41:2022-2027.

Goebel T S, McInnes K J, Senseman S A, Lascano R J, Marchand L S, Davis T A (2011) Modifying polymer flocculants for the removal of inorganic phosphate from water. Tetrahedron Letters 52 (41):5241-5244.

Gouider M, Mlaik N, Feki M, Sayadi S (2011) Integrated Physicochemical and Biological Treatment Process for Fluoride and Phosphorus Removal from Fertilizer Plant Wastewater. Water Environ Res 83 (8):731-738.

Guan X H, Shang C, Chen G H (2006) Competitive adsorption of organic matter with phosphate on aluminum hydroxide. Journal of Colloid and Interface Science 296 (1):51-58.

Hussain S, Aziz H A, Isa M H, Ahmad A, Van Leeuwen J, Zou L, Beecham S, Umar M (2011) Orthophosphate removal from domestic wastewater using limestone and granular activated carbon. Desalination 271 (1-3):265-272.

Karageorgiou K, Paschalis M, Anastassakis G N (2007) Removal of phosphate species from solution by adsorption onto calcite used as natural adsorbent. Journal of Hazardous Materials 139 (3):447-452.

Kirschling T L, Gregory, K B, Minkley E G, Lowry G V, Tilton R D (2010) Impact of nanoscale zero valent iron on geochemistry and microbial populations in trichloroethylene contaminated aquifer materials. Environ. Sci. Technol. 44, 3474-3480.

Kroll E, Winnik F M, Ziolo R F (1996) In situ preparation of nanocrystalline gamma-$Fe_2O_3$ in iron(II) cross-linked alginate gels. Chemistry of Materials 8 (8):1594-1596

Mezenner N Y, Bensmaili A (2009) Kinetics and thermodynamic study of phosphate adsorption on iron hydroxide-eggshell waste. Chemical Engineering Journal 147 (2-3): 87-96.

Mishra S P, Das M, Dash U N (2010) Review on adverse effects of water contaminants like arsenic, fluoride and phosphate and their remediation. J Sci Ind Res 69 (4):249-253

Ogata T, Morisada S, Oinuma Y, Seida Y, Nakano Y (2011) Preparation of adsorbent for phosphate recovery from aqueous solutions based on condensed tannin gel. Journal of Hazardous Materials 192 (2):698-703.

Pan B J, Wu J, Pan B C, Lv L, Zhang W M, Xiao L L, Wang X S, Tao X C, Zheng S R (2009) Development of polymer-based nanosized hydrated ferric oxides (HFOs) for enhanced phosphate removal from waste effluents. Water Research 43 (17):4421-4429.

Phenrat, T, Long, T C, Lowry, G V, Veronesi, B (2009). Partial oxidation ("aging") and surface modification decrease the toxicity of nanosized zerovalent iron. Environ. Sci. Technol. 43, 195-200.

Sreeram K J, Shrivastava H Y, Nair B U (2004) Studies on the nature of interaction of iron(III) with alginates. Biochimica Et Biophysica Acta-General Subjects 1670 (2):121-125.

Example 2

Compositional Analysis of Iron-Functionalized Alginate Beads

Figure 11:
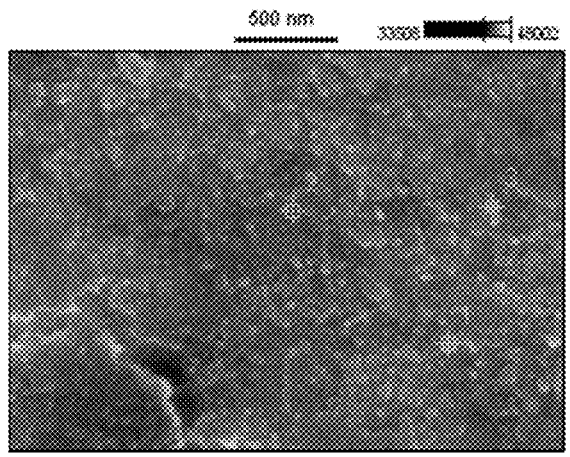
FIG. 11 shows SEM/EDS images of cross sections of new dry Fe-functionalized alginate (FFA) beads prior to use.
Figure 12:
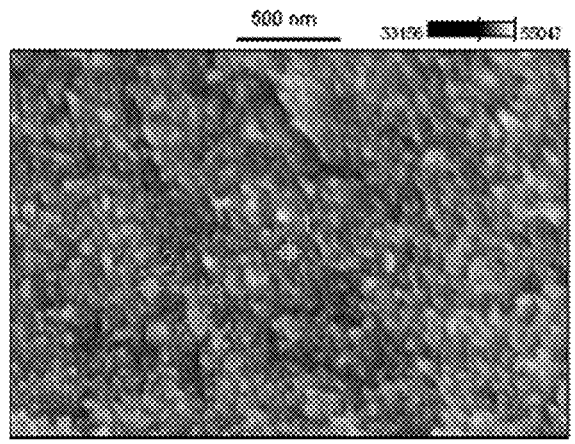
FIG. 12 shows SEM/EDS images of cross sections of spent dry FFA beads after use.

Compositional analysis was performed on dry FFA beads before and after sorption of phosphate. FIGS. 11 and 12 show SEM/EDS images of cross sections of dry FFA beads. Beads were dried using a vacuum oven under an $N_2$ environment. FIG. 11 shows SEM/EDS images of cross sections of new dry FFA beads (before sorbing phosphate). FIG. 12 shows SEM/EDS images of cross sections of spent dry FFA beads (after sorbing phosphate).

Results for Fresh FFA Beads (Before Sorbing Phosphate)

| | Weight % | | | | |
|---|---|---|---|---|---|
| | C-K | O-K | Cl-K | Ca-K | Fe-L |
| 125559 NEW ALGINATE DRY XSECT(1)_pt | 24.74 | 15.64 | 28.04 | 0.56 | 31.02 |
| 125559 NEW ALGINATE DRY XSECT(1)_pt2 | 27.09 | 14.07 | 32.13 | 0.60 | 26.11 |
| 125559 NEW ALGINATE DRY XSECT(1)_pt3 | 33.70 | 9.76 | 41.93 | 0.73 | 13.8 |

| | |
|---|---|
| Carbon | 24-38% |
| Fe | 13-31% |

Results for Used FFA Beads (after Sorbing Phosphate)

| Weight % | | | | | | |
|---|---|---|---|---|---|---|
| | C-K | O-K | P-K | K-K | Ca-K | Fe-L |
| 125560 USED ALGINATE DRY XSECT(2)_pt1 | 25.27 | 27.16 | 6.28 | 3.41 | | 37.88 |
| 125560 USED ALGINATE DRY XSECT(2)_pt2 | 22.21 | 26.94 | 6.38 | 3.38 | 0.55 | 40.54 |
| 125560 USED ALGINATE DRY XSECT(2)_pt3 | 24.00 | 25.99 | 6.61 | 3.97 | | 39.43 |

| | |
|---|---|
| Carbon | 24-26% |
| Fe | 37-41% |
| Phosphorous | 6-7% |

Example 3

Crosslinked Alginates

The use of a number of biopolymers like alginate, poly (methyl methacrylate) (PMMA), chitosan, and carrageenan have been explored for environmental remediation applications (Bezbaruah et al., 2009; Bezbaruah et al., 2011).

Alginate is a biopolymer derived from seaweeds, and it has been used for entrapment for microbial cells and NZVI (Bezbaruah et al., 2009, Kim et al., 2010). The entrapped NZVI was found to work very efficiently for contaminants like trichloroethylene (TCE). The entrapment process does not require sophisticated instrumentation and can be performed at ambient temperature and pressure. Ca-alginate is non-toxic, biodegradable, and sparsely soluble in water making it an ideal polymer for use in environmental applications (Bezbaruah et al., 2009a). The porous nature of Ca-alginate allows solutes to diffuse and come in contact with the entrapped NZVI (Bezbaruah et al., 2009).

Ionic cross-linking refers to the ion exchange process between the monovalent ion on the water soluble alginate (e.g., sodium or potassium ions) and the multivalent ion (e.g., $Ca^{2+}$) to give a sol/gel transition (Draget et al., 1998). The characteristic chelate-type ion-binding properties of alginates can be explained by 'egg-box' model in which electronegative cavities are formed by polyguluronic chains in alginate to host divalent cations (Grant et al., 1973; Morris et al., 1978). In this model, guluronate sequences are responsible for creating cavities where the multivalent ions coordinate along the alginate chains (Mehrotra, 1983). The coordination of metal-carboxylate can occur in different ways: (a) an ionic or uncoordinated form, (b) unidentate coordination, (c) bidentate chelating coordination, and (d) bidentate bridging coordination (Papageorgiou et al., 2010).

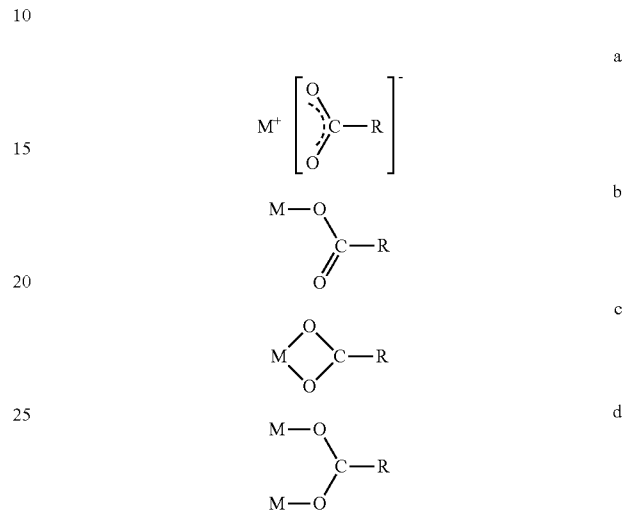

Types of metal-carboxylate coordination (After Papageorgiou et al., 2010). (a) an ionic or uncoordinated form, (b) unidentate coordination, (c) bidentate chelating coordination, and (d) bidentate bridging coordination.

Sodium alginate is the salt of alginic acid which consists of two uronic acids, b-D-mannuronic acid and a-L-guluronic acid. $Ca^{2+}$ is typically used to replace $Na^+$ in alginate to produce Ca-alginate. This stable gels is formed as $Ca^{2+}$ interact ionically with blocks of uronic acid residues to form a three-dimensional network that is usually described by the 'egg-box' model (Papageorgiou et al., 2010). Other di-valent ions such as $Fe^{+2}$ can also be used to cross-link with alginate. $Fe^{+2}$ has been cross-linked with alginate and used in the biomedical research (Machida-Sano et al., 2009).

Formation and chemical structure of Fe (II) alginate coordination polymer:

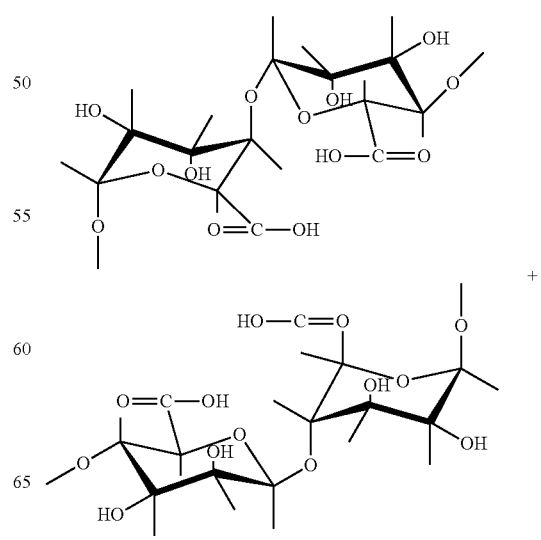

-continued

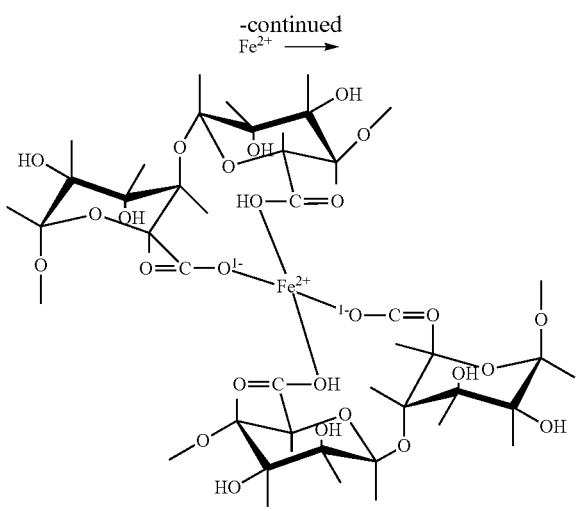

Based on the molar ratio of alginate to Fe (II) of 1:2 (from the conductivity study performed), the above structure can be predicted where the iron ion coordinates with carboxyl group on the L-guluronic acid (G units). Other forms of hydrogen bonds between the iron ion and other hydroxyl groups might take place as well.

References

Bezbaruah, A. N., S. Krajangpan, B. J. Chisholm, E. Khan and J. J. E. Bermudez. 2009. Entrapment of iron nanoparticles in calcium alginate beads for groundwater remediation applications. Journal of Hazardous Materials 166: 1339-1343.

Bezbaruah, A. N., S. S. Shanbhogue, S. Simsek and E. E. Khan. 2011. Encapsulation of iron nanoparticles in alginate biopolymer for trichloroethylene remediation. Journal of Nanoparticle 13:(12), 6673-6681.

De-Bashan L E, Bashan Y (2004) Recent advances in removing phosphorus from wastewater and its future use as fertilizer (1997-2003). Water Research, 38:(19), 4222-4246.

Draget K I, Steinsva G K, Onsoyen E, Smidsrod O (1998) Na- and K-alginate; effect on Ca2+ gelation. Carbohydr Polym, 35 1-6.

Du W C, Sun Y Y, Ji R, Zhu J G, Wu J C, Guo H Y (2011) TiO2 and ZnO nanoparticles negatively affect wheat growth and soil enzyme activities in agricultural soil. Journal of Environmental Monitoring 13(4):822-828.

Grant G T, Morris E R, Rees D A, Smith P J, Thom D (1973) Biological interactions between polysaccharides and divalent cations: the egg-box model. FEBS Lett. 32: 195-198

Kim H, Hong H, Jung J, Kim S, Yang J. (2010) Degradation of trichloroethylene (TCE) by nanoscale zero-valent iron (nZVI) immobilized in alginate bead. Journal of Hazardous Materials 176(1-3):1038-1043.

Kim, H., H. J. Hong, J. Jung, S. H. Kim, and J. W. g. 2010a. Degradation of trichloroethylene (TCE) by nanoscale zero-valent iron (nZVI) immobilized in alginate bead. Journal of Hazardous Materials 176: 1038-1043.

Machida-Sano I, Matsuda Y, Namiki H (2009) In vitro adhesion of human dermal fibroblasts on iron cross-linked alginate films. Biomedical Materials 4(2).

Mehrotra, R. C.; Bohra, R. In Metal Carboxylates. Academic Press: London, UK, 1983.

Morris E R, Rees D A, Thom D, Boyd J (1978) Chiroptical and stoichiometric evidence of a specific, primary dimerisation process in alginate gelation. Carbohydrate research, 66:(1), 145-154.

Papageorgiou S K, Kouvelos E P, Favvas E P, Sapalidis A A, Romanos G E, Katsaros F K (2010) Metal-carboxylate interactions in metal-alginate complexes studied with FTIR spectroscopy. Carbohydrate Research 345(4):469-473.

Papageorgiou S K, Kouvelos E P, Favvas E P, Sapalidis A A, Romanos G E, Katsaros F K (2010) Metal-carboxylate interactions in metal-alginate complexes studied with FTIR spectroscopy. Carbohydrate research, 345:(4), 469-473.

Tanboonchuy V, Hsu J C, Grisdanurak N, Liao C H (2011) Impact of selected solution factors on arsenate and arsenite removal by nanoiron particles. Environmental Science and Pollution Research 18(6):857-864.

Zhang, W. X. 2003. Nanoscale iron particles for environmental remediation: An overview. Journal of Nanoparticle Research 5: 323-332.

Example 4

Bare NZVI and Iron Cross-Linked Alginate Beads: Applications for Phosphate Removal from Actual Wastewaters Applications of nanoscale zero-valent iron (NZVI) and iron cross-linked alginate (FCA) beads were explored in this study for phosphate removal from actual wastewaters. Wastewater treatment plant effluent (WTPE) and animal feedlot effluent/runoff (AFLE) samples were used in the phosphate removal studies. While FCA beads removed 97% of the $PO_4^{3-}$ in 2 h from WTPE, NZVI removed 84%. However, the difference was not statistically significant. Fast removal rate was observed with FCA used to remove phosphate from AFLE (~77% removal at the end of 15 min). The FCA beads continued to remove phosphate faster than NZVI until ~60 min. Results have indicated that FCA beads were more efficient (85%) as compared to NZVI particles (57%) in the first hour. The overall $PO_4^{3-}$ removal by FCA beads reduced from 85% in 1 h to 75% at 24 h. This removal rate has possible application in the field with high flow rate systems.

Introduction

Excessive discharge of phosphorus (P) in surface water causes deterioration of water quality. Nutrient (P) richness in surface water bodies results in eutrophication of the water bodies. Eutrophication has significant economic impacts on local communities.

Two of the major sources of phosphate in surface water are wastewater effluent (point-source) and animal feedlot runoff (nonpoint-source). The estimated contributions of P sources to municipal wastewater from human wastes, laundry detergents, and other cleaners are 0.6, 0.3, and 0.1 kg P/capita/year, respectively (Sengupta et al 2011). Municipal wastewater contains adequate amount (5-15 mg/L) of P (Blackall et al., 2002). Even though the contribution of laundry detergents in increasing P in wastewater successfully reduced nowadays, P concentration in WWT effluent would reduce by only to 4-5 mg/L P (USGS, 1999). This effluent with high concentration of P finds its way to lakes and surface waters. Various studies have indicated that concentrations of P above 0.02 mg/L accelerate eutrophication of water bodies (Sharpley et al., 2003; Seviour et al., 2003).

Materials and Methods

Chemicals

Iron (II) chloride tetrahydrate ($FeCl_2.4H_2O$, reagent grade, J. T. Baker), calcium chloride ($CaCl_2$, ACS grade, BDH), monopotassium phosphate ($KH_2PO_4$, 99% pure, EMD), sodium alginate (production grade, Pfaltz & Bauer), potassium nitrate (KNO$_3$, 99%, Alfa Aesar), sodium hydroxide (NaOH, ACS Grade, BDH), sodium borohydride (NaBH$_4$, 98%, Aldrich), methanol (production grade, BDH) were used as received unless and otherwise specified.

NZVI Synthesis

NZVI was prepared as described by (Almeelbi, 2012). Briefly, FeCl$_3$ solution was dropped into sodium borohydride solution and stirred for 30 min. The black resultant black precipitate (NZVI) was separated, washed by methanol and water using a centrifuge. The washed (NZVI) particles were dried using a vacuum oven under N$_2$ environment overnight and then ground using a mortar and pestle. The fine black powder was stored in a 20 mL vial for later use. Particles were not stored more than two weeks. The detailed method of NZVI has been reported by Almeelbi and Bezbaruah (2012).

Beads Synthesis

Alginate solution (5 mL of 2% w/v) was dropped into FeCl$_2$ solution (35 mL of 2% w/v) in a 50 mL polypropylene plastic vial using a pump with very small tube track to reduce the loss of alginate. Moreover, the first batch was sacrificed to ensure eliminate any effect of alginate volume reduction due to alginate that might have remained within the tubings. Beads were kept in the FeCl$_2$ solution for at least 6 h with vial was capped.

Samples Collection and Storage

Municipal Wastewater Treatment Plant (WTPE) Effluent:

Samples were obtained from the City of Moorhead Wastewater Treatment Plant (Moorhead, Minn., USA). Moorhead follows a pure oxygen activated sludge treatment scheme. The secondary treated wastewater is subjected to tertiary treatment that involved nitrogen removal and additional polishing for organics and suspended solids. Tertiary treated wastewater samples from the effluent sampling point in outlet leading to the Red River outfall were collected in plastic containers (~8 L). The WTPE was filtered through a 1.2 μm pore-size Whatman glass microfiber filter (GF/C) before use in the experiments or stored in the refrigerator at 4° C. for later use. Stored samples were used within a month.

Animal Feedlot Effluent (AFE):

Samples were collected from a privately owned cattle feedlot at Sargent County, N. Dak., USA. Unfiltered samples were used immediately or stored in a plastic container (~8 L) in the refrigerator at 4° C. for later use. Stored samples were used within a month.

Batch Studies

WTPE and AFLE samples were used in PO$_4^{3-}$ removal studies with NZVI and FCA beads as the sorbents. One batch of FCA beads (0.121 g dry weight) or 0.02 g NZVI were added to 50 mL of wastewater in multiple polypropylene plastic vials fitted plastic caps (reactors). The reactors were rotated end-over-end at 28 rpm in a custom-made shaker to reduce mass transfer resistance. A set of sacrificial reactors was withdrawn at specific time interval. The phosphate concentration in the bulk solution was measured and reported as average (with standard deviations) of readings from three replicate studies.

Phosphate Analysis

Ascorbic acid method (Eaton et al., 2005) was used for phosphate analysis. This method depends on the direct reaction of orthophosphate with molybdate anions to form a yellow-colored phosphomolybdate complex. Ascorbic acid reduces phosphomolybdic to form molybdenum blue species that has a broad absorbance range in between 700 nm to 900 nm. The color was measured in a UV-vis spectrophotometer (HACH, DR 5000) at wavelength of 880 nm. A five-point calibration was done routinely.

Quality Control

All experiments were done in triplicates during this research and the average values are reported along with the standard deviations. Blanks with only wastewater/runoff (without NZVI/FCA beads) were run along with the NZVI and FCA bead experiments. The analytical instruments and tools were calibrated before the day's measurements. One-way ANOVA tests were performed to compare the variance between data sets as needed. Minitab 16 software (Minitab, USA) was used for all statistical analyses.

Results and Discussion

Beads Characterization

Figure 13:
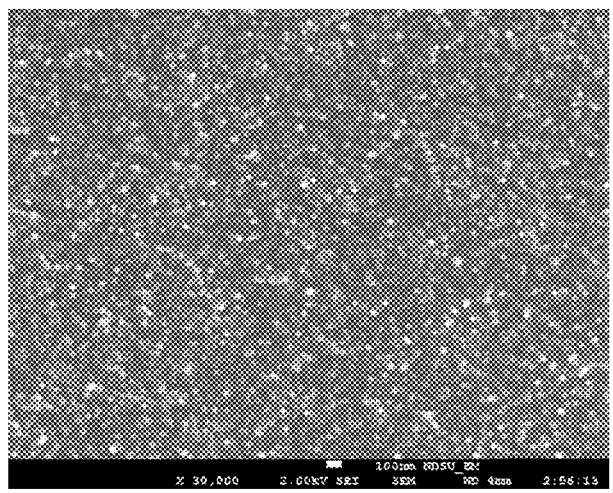
FIG. 13 shows an SEM image of fresh dry FCA beads.

Beads were approximately spherical in shape with average diameters of 3.09±0.16 mm and each batch of dry FCA beads weighted 0.121±0.002 g. SEM analysis of the beads were done after drying the beads for 24 h in a vacuum oven under nitrogen environment. Iron nanoparticles was observed inside the dried the beads (FIG. 13), and the nanoparticles had an average size of 74.45±35.60 nm (n=97).

NZVI Characterization

Almeelbi and Bezbaruah (2012) have used TEM to determine the size of NZVI and reported the particle size as 16.24±4.05 nm (n=109).

Phosphate Removal from WTPE

Figure 14:
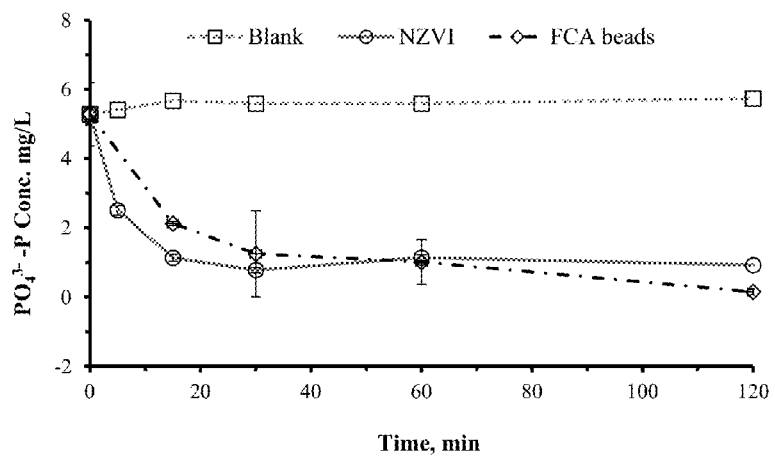
FIG. 14 shows removal of $PO_4^{3-}$ from wastewater treatment plant effluent (WTPE) using bare NZVI and FCA beads.
Figure 15:
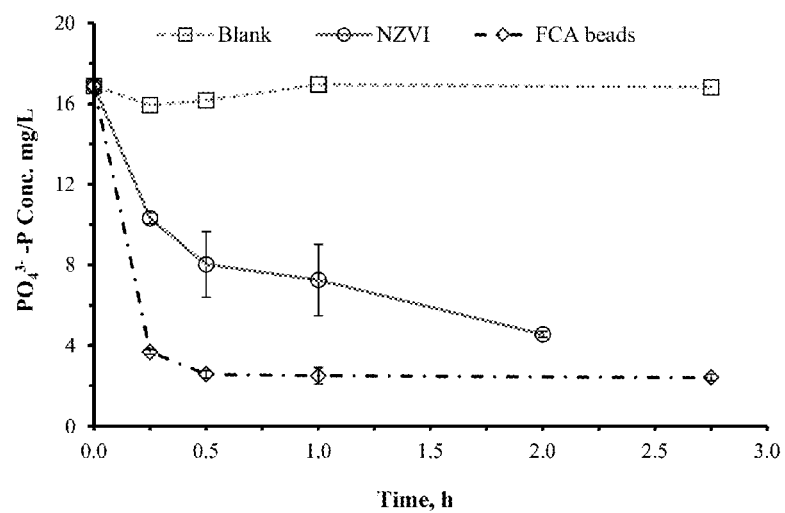
FIG. 15 shows removal of $PO_4^{3-}$ from animal feedlot effluent/runoff (AFLE) using NZVI and FCA beads.

In batch studies conducted using NZVI and FCA beads for PO$_4^{3-}$ removal from WTPE, FCA beads removed 97% of the PO$_4^{3-}$ in 2 h while NZVI removed only 84% (FIG. 15). NZVI was faster in removing PO$_4^{3-}$ as compared FCA in the first 15 min, and removed 80% PO$_4^{3-}$ while FCA beads removed only 63%. NZVI continued to perform better till ~30 min beyond which FCA removed PO$_4^{3-}$ at better rate than NZVI. (FIG. 14.) However, ANOVA analysis indicates that there is no significant difference between the PO$_4^{3-}$ removal efficiencies by NZVI and FCA beads after 2 h (p=0.629). The finding is important from field application perspective. While it may be difficult to use and then recover NZVI particles (average diameter ~16 nm) in wastewater treatment plant or similar set-ups, the FCA beads which are much larger (average diameter ~3 mm) will be easily recoverable. Further, there are still a number of unknowns about the toxicity of NZVI. Saleh et al., (2008) found that coated NZVI can remain mobile in aqueous media even after 8 months of application and may be toxic to humans. There are also other reports on toxicity of NZVI (Keller, 2012; Li, 2010; Phenrat, 2009; Xiu, 2010) that call for caution in wide scale application of the bare or unmodified nanoparticles.

Phosphate Removal from AFLE

Batch study results have indicated that FCA beads were more efficient (85%) as compared to NZVI particles (57%) in the first hour (FIG. 15) of reaction in removing PO$_4^{3}$ from animal feedlot effluent (AFLE). Statistical analysis indicate that the results from these two sets of experiments are significantly different (one-way ANOVA, p=0.00). Data points could not be collected exactly at 2 h for all the samples due to management issues and, therefore, have not been compared.

Figure 16:
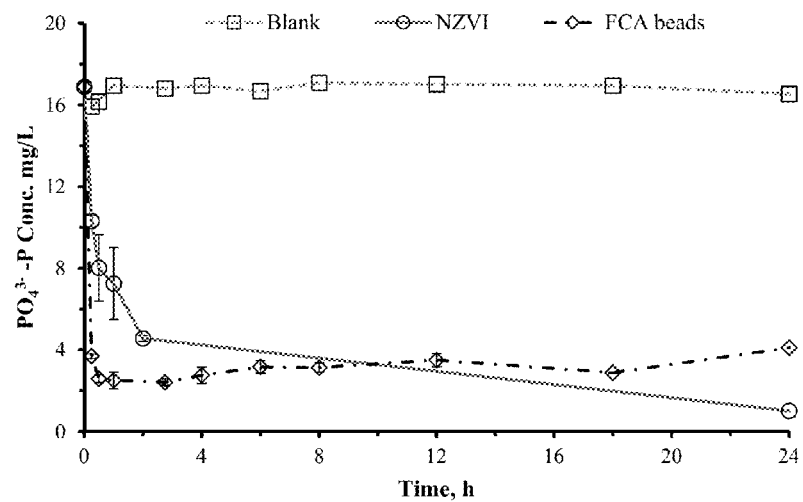
FIG. 16 shows removal of $PO_4^{3-}$ from AFLE using NZVI and FCA beads over a 24 h period.

The batch studies with the AFLE were continued till 24 h (FIG. 16) and it was observed that the overall PO$_4^{3-}$ removal by FCA beads reduced from 85% in 1 h to 75% at 24 h. There is no immediate explanation for this behavior of the beads till further research is conducted. However, a possible reason may have to do with the presence of orthophosphate in the particulate form. AFLE was used as received (without any filtration) for PO$_4^{3-}$ removal using NZVI and FCA beads. A layer of visible black particles was observed on the beads at the end of the reaction which may be the particulate PO$_4^{3-}$ and they might have contributed to the increase in PO$_4^{3-}$ concentration. Further studies may be needed to understand this behavior of the beads. It is, however, clear that FCA beads can be used to remove phosphate from AFLE. $PO_4^{3-}$ removal was ~77% at the end of 15 min (Table 3). The short contact time needed for $PO_4^{3-}$ removal is expected to have major ramifications as FCA beads can possibly be used in high flow system (e.g., pumped system).

TABLE 3

$PO_4^{3-}$ removal from AFLE using NZVI and FCA beads

| Time, h | % $PO_4^{3-}$ Removal | |
|---|---|---|
| | FCA | NZVI |
| 0.25 | 76.85 | 35.23 |
| 0.50 | 84.07 | 50.39 |
| 1.00 | 85.27 | 57.22 |
| 2.75 | 85.66 | 72.91 |
| 4.00 | 83.80 | — |
| 6.00 | 81.05 | — |
| 8.00 | 81.67 | — |
| 12.00 | 79.50 | — |
| 18.00 | 83.03 | — |
| 24.00 | 75.21 | 94.06 |

Data at 4, 6, 8, 12, and 18 h were not collected for NZVI studies

Conclusions

NZVI and FCA beads successfully removed $PO_4^{3-}$ from both municipal wastewater (WTPE) and animal feedlot effluent (AFLE). The fact that FCA beads could remove 63% and 77% $PO_4^{3-}$ from WTPE and AFLE, respectively, within the first 15 min provides a huge advantage for their application in high flow systems. NZVI particles were also effective in removing $PO_4^{3-}$ from waters. However, FCA beads performed better with AFLE. More experiments need to be conducted to determine the possibility of $PO_4^{3-}$ recovery from FCA beads.

References

Almeelbi T, Bezbaruah A N (2012) Aqueous phosphate removal using nanoscale zero-valent iron. Journal of Nanoparticle Research, 14(7), 1-14

Saleh N, Kim H J, Phenrat T, Matyjaszewski K. Tilton R D. Lowry G V. (2008) Ionic strength and composition affect the mobility of surface-modified $Fe^0$ nanoparticles in water-saturated sand columns. Environ. Sci. Technol, 42, 3349-3355.

Li Z Q, Greden K, Alvarez P J J, Gregory K B, Lowry G V (2010) Adsorbed Polymer and NOM Limits Adhesion and Toxicity of Nano Scale Zerovalent Iron to E. coli. Environ Sci Technol 44:3462-3467. doi:10.1021/es9031198

Phenrat T, Long T C, Lowry G V, Veronesi B (2009) Partial oxidation ("aging") and surface modification decrease the toxicity of nanosized zerovalent iron. Environ. Sci. Technol., 43: (1), 195-200.

Xiu Z M, Gregory K B, Lowry G V, Alvarez P J (2010). Effect of Bare and Coated Nanoscale Zerovalent Iron on tceA and vcrA Gene Expression in Dehalococcoides spp. Environmental science & technology, 44(19), 7647-7651.

Keller A A, Garner K, Miller R J, Lenihan H S (2012) Toxicity of Nano-Zero Valent Iron to Freshwater and Marine Organisms. PLoS ONE 7(8) e43983

Blackall L L, Crocetti G, Saunders A M, Bond P L (2002) A review and update of the microbiology of enhanced biological phosphorus removal in wastewater treatment plants. Antonie Van Leeuwenhoek International Journal of General and Molecular Microbiology 81(1-4):681-691.

USGS (1999) Phosphorus in a Ground-Water Contaminant Plume Discharging to Ashumet Pond, Cape Cod, Mass., Northborough, Mass.

Sharpley A N, Daniel T, Sims T, Lemunyon J, Stevens R, Parry R (2003) Agricultural Phosphorus and Eutrophication (second ed.) United States Department of Agriculture, Agricultural Research Service Seviour R J, McIlroy S (2008) The microbiology of phosphorus removal in activated sludge processes—the current state of play. Journal of Microbiology 46(2):115.

The complete disclosures of all patents, patent applications including provisional patent applications, publications including patent publications and nonpatent publications, and electronically available material (e.g., GenBank amino acid and nucleotide sequence submissions) cited herein are incorporated by reference. The foregoing detailed description and examples have been provided for clarity of understanding only. No unnecessary limitations are to be understood therefrom. The invention is not limited to the exact details shown and described; many variations will be apparent to one skilled in the art and are intended to be included within the invention defined by the claims.

What is claimed is:

1. A biodegradable material comprising iron-functionalized alginate, wherein the iron-functionalized alginate is prepared by the process of:
reacting a source of $FeCl_2$ with sodium alginate to yield an iron-functionalized alginate bead; and
hardening the iron-functionalized alginate bead in $FeCl_2$ solution.

2. The biodegradable material of claim 1 wherein the iron-functionalized alginate is Fe(II)-functionalized alginate.

3. The biodegradable material of claim 1 wherein the bead comprises an entrapped nanoparticle.

4. The biodegradable material of claim 1 further comprising phosphorous-containing compound.

5. The biodegradable material of claim 1 further comprising a selenium containing compound.

6. A method for making the biodegradable material of claim 1, the method comprising:
reacting a source of $FeCl_2$ with sodium alginate to yield an iron-functionalized alginate bead; and
hardening the iron-functionalized alginate bead in $FeCl_2$ solution.

7. A method for removing a contaminant from an aqueous medium comprising:
contacting the aqueous medium with the biodegradable material of claim 1 under conditions and for a time effective to sorb the contaminant.

8. The method of claim 7 wherein the contaminant comprises a phosphorous containing compound or a selenium containing compound.

9. The method of claim 8 wherein the contaminant comprises orthophosphate ($PO_4^3$), hydrogen phosphate ($HPO_4^{2-}$), dihydrogen phosphate, ($H_2PO_4^-$), magnesium ammonium phosphate ($MgNH_4PO_4.6H_2O$, struvite), hydroxyapatite, a polyphosphate, an organic phosphate, a selenate, Se(VI), $SeO_4^{-2}$, a selenite, Se(IV), $HSeO_3$, elemental selenium, a selenide, (Se-II), $Se^{2-}$, $HSe^-$, or any combination thereof.

10. The method of claim 7 wherein the aqueous medium is a eutrophic lake, municipal and industrial wastewater, agricultural runoff, effluent from water or sewer treatment plants, acid mine drainage, sludge, groundwater, a reservoir, well water, a marsh, swamp, a bay, an estuary, a river, a stream, an aquifer, a tidal or intertidal area, a sea or an ocean.

11. The method of claim 7 wherein the pH of the aqueous environment is higher than 7.5.

12. The method of claim 7 wherein the biodegradable material is disposed within a stationary treatment medium.

13. The method of claim 12 wherein the stationary treatment medium comprises a permeable reactive barrier, a slurry wall, a filtration bed, or a filter.

14. The method of claim 7 further comprising:
collecting the used biodegradable material, wherein the used biodegradable material comprises a sorbed contaminant.

15. The method of claim 7 further comprising
applying the used biodegradable material to soil as a fertilizer, wherein the used biodegradable material comprises a sorbed contaminant, and wherein the sorbed contaminant comprises a nutrient.

16. The method of claim 15 wherein the nutrient comprises a phosphorous containing compound, a selenium containing compound, or a combination thereof.

17. The method of claim 7, wherein the aqueous medium comprises surface water or groundwater, and wherein the contaminant comprises arsenic.

18. The method of claim 7 wherein the aqueous medium comprises an aquifer or well water.

19. A method for making a fertilizer comprising:
identifying an aqueous medium comprising a nutrient comprising phosphorus-containing compound or a selenium-containing compound, or both;
contacting the aqueous medium with the biodegradable material of claim 1 under conditions and for a time effective to sorb the nutrient onto the biodegradable material to yield a charged biodegradable material; and
incorporating the charged biodegradable material into a fertilizer composition.

* * * * *